US008374660B1

(12) United States Patent
Steigerwald et al.

(10) Patent No.: US 8,374,660 B1
(45) **Date of Patent: *Feb. 12, 2013**

(54) APPARATUS AND METHOD FOR REDUCING THE ELECTROMAGNETIC INTERFERENCE BETWEEN TWO OR MORE ANTENNAS COUPLED TO A WIRELESS COMMUNICATION DEVICE

(75) Inventors: Todd W. Steigerwald, Austin, TX (US); Jerry Mayfield, Georgetown, TX (US)

(73) Assignee: Motion Computing, Inc., Austin, TX (US)

( * ) Notice: Subject to any disclaimer, the term of this patent is extended or adjusted under 35 U.S.C. 154(b) by 1085 days.

This patent is subject to a terminal disclaimer.

(21) Appl. No.: 11/619,668

(22) Filed: Jan. 4, 2007

Related U.S. Application Data

(62) Division of application No. 10/791,082, filed on Mar. 2, 2004, now Pat. No. 7,164,933.

(51) Int. Cl.
*H04M 1/00* (2006.01)

(52) U.S. Cl. ............... 455/575.5; 455/562.1; 455/575.7; 455/97; 455/13.2; 343/851; 343/916; 343/841; 343/907; 343/915

(58) Field of Classification Search ............... 455/114.2, 455/562.1, 129, 575.5, 575.7, 97, 13.2, 82; 343/841

See application file for complete search history.

(56) References Cited

U.S. PATENT DOCUMENTS

| | | | | |
|---|---|---|---|---|
| 3,541,559 | A | 11/1970 | Evans | |
| 3,681,770 | A * | 8/1972 | Alford | 343/815 |
| 4,075,633 | A * | 2/1978 | Lewis | 342/381 |
| 4,342,033 | A * | 7/1982 | de Camargo | 343/753 |
| 4,460,899 | A | 7/1984 | Schmidt et al. | |
| 4,598,276 | A | 7/1986 | Tait | |
| 4,668,958 | A * | 5/1987 | Keiser | 343/916 |
| 4,743,083 | A | 5/1988 | Schimpe | |
| 4,965,479 | A * | 10/1990 | Elliott et al. | 310/313 D |
| 5,220,234 | A * | 6/1993 | Flory et al. | 310/313 D |
| 5,543,815 | A | 8/1996 | Wu et al. | |
| 5,727,963 | A | 3/1998 | LeMaster | |
| 5,844,519 | A * | 12/1998 | Heierli et al. | 342/28 |
| 5,859,878 | A * | 1/1999 | Phillips et al. | 375/316 |
| 5,867,535 | A * | 2/1999 | Phillips et al. | 375/295 |
| 5,905,467 | A | 5/1999 | Narayanaswamy et al. | |
| 5,978,655 | A | 11/1999 | Ohura et al. | |
| 6,137,998 | A | 10/2000 | Holshouser et al. | |
| 6,262,495 | B1 | 7/2001 | Yablonovitch et al. | |
| 6,411,261 | B1 * | 6/2002 | Lilly | 343/756 |
| 6,512,494 | B1 | 1/2003 | Diaz et al. | |

(Continued)

FOREIGN PATENT DOCUMENTS

WO WO98/09490 * 3/1998

OTHER PUBLICATIONS

U.S. Appl. No. 10/791,084, filed Mar. 2, 2004.

(Continued)

*Primary Examiner* — Zhiyu Lu

(74) *Attorney, Agent, or Firm* — Charles D. Huston; Daffer McDaniel, LLP

(57) ABSTRACT

An apparatus for reducing the electromagnetic interference between two or more co-located antennas is described herein. In one embodiment, the apparatus is positioned proximate to a second antenna for intercepting electromagnetic energy radiated from a first antenna during transmission of a signal. To reduce interference at the second antenna, the apparatus includes a plurality of resonant circuit elements, each being configured to resonate at or near a carrier frequency of the transmitted signal for redirecting at least a portion of the electromagnetic energy away from the second antenna. A method for reducing the electromagnetic interference between two or more antennas coupled to a wireless communication device is also disclosed herein.

13 Claims, 10 Drawing Sheets

U.S. PATENT DOCUMENTS

| | | | | |
|---|---|---|---|---|
| 6,542,131 | B1 * | 4/2003 | Haapanen | 343/813 |
| 6,624,536 | B1 | 9/2003 | Sawada et al. | |
| 6,654,231 | B2 | 11/2003 | Teshima | |
| 6,680,712 | B2 | 1/2004 | Ogawa et al. | |
| 6,752,320 | B1 | 6/2004 | Herranen | |
| 6,894,648 | B2 | 5/2005 | Kozakai | |
| 6,897,831 | B2 | 5/2005 | McKinzie, III et al. | |
| 7,369,879 | B1 | 5/2008 | Steigerwald et al. | |
| 7,514,413 | B2 * | 4/2009 | Martin et al. | 514/34 |
| 2002/0000937 | A1 | 1/2002 | Kozakai | |
| 2002/0149534 | A1 * | 10/2002 | Bobier | 343/841 |
| 2003/0210199 | A1 | 11/2003 | Sward et al. | |
| 2004/0157644 | A1 * | 8/2004 | Aytur et al. | 455/562.1 |
| 2005/0041624 | A1 | 2/2005 | Hui et al. | |
| 2005/0068233 | A1 * | 3/2005 | Tanaka et al. | 343/700 MS |

OTHER PUBLICATIONS

Office Action mailed Feb. 24, 2006 for U.S. Appl. No. 10/791,084.

Final Office Action mailed Aug. 3, 2006 for U.S. Appl. No. 10/791,084.

Office Action mailed Jan. 18, 2007 for U.S. Appl. No. 10/791,084.

Final Office Action mailed Jul. 6, 2007 for U.S. Appl. No. 10/791,084.

BPAI Decision mailed Mar. 29, 2010 for U.S. Appl. No. 10/791,084.

Office Action mailed Feb. 7, 2006 for U.S. Appl. No. 10/791,085.

Final Office Action mailed Jul. 11, 2006 for U.S. Appl. No. 10/791,085.

Notice of Allowance mailed Mar. 29, 2007 for U.S. Appl. No. 10/791,085.

U.S. Appl. No. 11/762,253, filed Jul. 13, 2007.

Office Action mailed Jul. 23, 2009 for U.S. Appl. No. 11/762,253.

Notice of Allowance mailed Jan. 15, 2010 for U.S. Appl. No. 11/762,253.

* cited by examiner

100

WIRELESS COMMUNICATION TECHNOLOGIES

| COMMUNICATION NETWORK | COMMUNICATION TECHNOLOGY | PRIMARY APPLICATION | ISM BAND (GHz) | RANGE (FEET) | MAX BIT RATE (Mbps) |
|---|---|---|---|---|---|
| **WWAN** | GSM | Digital cellular phone service | 900/1800 (MHz) | N/A | 115 (Kbps) |
| | PCS | Digital cellular phone service | 1850-1990 (MHz) | N/A | |
| | GPRS | Broadband access for mobile phones and computers | 900/1800 (MHz) | N/A | 115 (Kbps) |
| | EDGE | Broadband access for mobile phones and computers | 900/1800 (MHz) | N/A | 384 (Kbps) |
| | UTMS | Broadband access for mobile phones and computers | 1885-2025 1980-2010 2170-2200 (MHz) | N/A | 2 (Mbps) |
| **WLAN** | IEEE 802.11a | Public access to a local area network | 5 | 75 | 54 |
| | IEEE 802.11b | Public access to a local area network | 2.4 | 150 | 11 |
| | IEEE 802.11g | Public access to a local area network | 2.4 | 150 | 54 |
| | HOMERF™ | Home networking | 2.4 | 150 | 1.6 |
| | OpenAir™ | Public access to a local area network | 2.4 | 500 | 1.6 |
| | HiperLAN1 | Public access to a local area network | 5 | 150 | 24 |
| | HiperLAN2 | Public access to a local area network | 5 | 75 | 54 |
| **WPAN** | BLUETOOTH™ | Cable replacement for wireless computing devices and peripherals | 2.4 | 30 | 1-2 |

*FIG. 1*

UNFOLDED PATTERN

FOLDED PATTERN

UNFOLDED PATTERN

FOLDED PATTERN

UNFOLDED PATTERN

FOLDED PATTERN

APPARATUS AND METHOD FOR REDUCING THE ELECTROMAGNETIC INTERFERENCE BETWEEN TWO OR MORE ANTENNAS COUPLED TO A WIRELESS COMMUNICATION DEVICE

The present application is a divisional application from prior application Ser. No. 10/791,082 filed Mar. 2, 2004.

BACKGROUND OF THE INVENTION

1. Field of the Invention

This invention relates to wireless communication technologies and, more particularly, to an apparatus and method for reducing radiated electromagnetic coupling between two or more antennas coupled to a wireless communications device.

2. Description of the Related Art

The following descriptions and examples are not admitted to be prior art by virtue of their inclusion within this section.

The term "wireless" is often used to describe telecommunications in which electromagnetic waves (rather than some form of wire) carry a transmitted signal over part or all of the communication path. Some monitoring devices, such as intrusion alarms, employ acoustic waves at frequencies above the range of human hearing; these are also sometimes classified as wireless.

As wireless communication technologies continue to evolve and mature, a growing number of wireless communication devices are becoming available. Examples of wireless communication devices in use today include: cellular telephones ("cell phones") and pagers, Personal Digital Assistants (PDA), Global Positioning Systems (GPS), cordless computer peripherals (e.g., cordless keyboards, printers and mice), cordless telephones (i.e., limited-range devices, not to be confused with cell phones), home-entertainment-system control boxes (e.g., VCR and TV channel control boxes, in addition to some hi-fi sound systems and FM broadcast receivers), remote garage-door openers, two-way radios, and satellite TV and radio devices. These communication devices, and numerous others, typically communicate over a variety of networks including: wireless local area networks (WLAN), wireless wide area networks (WWAN) and wireless personal area networks (WPAN).

Wireless Local Area Network (WLAN) technologies allow communication to a Local Area Network (or LAN, such as an Ethernet or Token Ring network), which may reside within a building, on a campus, or in public "hotspot" areas such as hotels or airports. Numerous specifications and protocols have been defined for accessing WLANs over relatively short distances (i.e., up to about 100 meters). The Institute of Electrical and Electronics Engineers (IEEE), for example, has defined a family of specifications (i.e., IEEE 802.11, 802.11a, 802.11b, and 802.11g standards) for controlling access to WLANs. Other specifications for accessing a WLAN may include: HomeRF™, OpenAir™, HiperLAN1, and HiperLAN2. The term "WLAN" is sometimes used to refer to a class of wireless communication technologies that operates over a distance of up to 100 meters.

Wireless Wide Area Network (WWAN) technologies allow communication to a geographically dispersed Wide Area Network (WAN). WWAN technologies use various devices (e.g., telephone lines, satellite dishes, and radio waves) to service an area broader than that which can be covered by a WLAN. WWAN technologies are typically used in cellular telecommunications and may include, for example: Global System for Mobile communication (GSM), a digital cell phone service widely used in Europe and other parts of the world; Personal Communications Services (PCS), a digital cell phone service widely used in the United States; Enhanced Data GSM Environment (EDGE), a faster version of the GSM service providing broadband access to mobile phones and computers; General Packet Radio Services (GPRS), a packet-based wireless communication service providing broadband access to mobile phones and computers; and Universal Mobile Telecommunications Service (UMTS), a packet-based wireless communication service providing a consistent set of broadband services to mobile phone and computer users, no matter where they are located in the world.

Wireless personal area network (WPAN) technologies allow communication to a Personal Area Network (PAN), or a network for interconnecting wireless devices that are centered around an individual person. Because WPAN technologies limit communications to a very short range (e.g., about 10 meters), they are specifically targeted as cable replacement wireless technologies for a range of diverse computing and telecommunication devices, such as portable PCs (e.g., notebook and tablet computers), peripherals (e.g., cordless keyboards, printers and mice), handheld devices (e.g., PDAs), cell phones, pagers and other consumer electronics. As such, a WPAN may serve to interconnect some or all of the computing and telecommunication devices that many people use in their home or office on a daily basis. The term "WPAN" may also be used to refer to a class of wireless communication technologies that operates over a distance of up to 10 meters.

Though technology for WPAN is in its infancy, compared to WLAN and WWAN technologies, it is undergoing rapid development. A key concept in WPAN technologies is known as "plugging in," which allows any two WPAN-equipped devices to communicate—as if they were connected by a cable—when the devices come within close proximity to each other (e.g., within several meters) or a central server (e.g., within a few kilometers). A primary objective of WPAN technology is to facilitate seamless operation among home and/or business WPAN-equipped devices and systems. Such an objective will allow every device in a particular WPAN to plug into any other device in the same WPAN, provided they are within an appropriate range of one another. Current WPAN technologies are addressed by the IEEE 802.15 standards, the initial version of which (IEEE 802.15.1) was adapted from a well-known and widely used specification known as "Bluetooth™."

To allow efficient use of the radio frequency (RF) spectrum (or "radio spectrum"), various frequency bands within the 3 KHz to 300 GHz RF spectrum are allocated to certain types of wireless communications. The allocated bands are then divided into a number of "channels" of equal bandwidth, so that a number of wireless devices may share the same band. However, problems often arise when two radios, operating within the same or different wireless device, come within a relatively close proximity of one another. For example, "interference" occurs when electromagnetic energy from a transmitted signal is coupled into the receive path of a receiver within a nearby radio. In other words, "interference" occurs whenever a radio receives, in addition to a desired signal, the signals from other radios that may be transmitting within the same (or a nearby) radio frequency band. Since the RF spectrum is a limited resource and needs to be shared by as many users as possible, interference problems severely limit the performance of many wireless communication devices by decreasing the dynamic range of the receiver, decreasing the throughput of the receiver, and in some cases, jamming radio operation altogether.

In an effort to address the interference problem, many wireless communications devices use spread-spectrum technologies to deliberately vary the transmission frequency, or channel, over which a signal is transmitted within a particular radio frequency (RF) band. The variation is done according to a specific, though complicated mathematical function that changes the transmission frequency abruptly, often many times a second. Most spread-spectrum technologies use a digital variation scheme called "frequency hopping," where a relatively stable transmission frequency is maintained between "hops" for a length of time known as the "dwell time." A few spread-spectrum technologies employ analog schemes to provide continuous frequency variation.

Unfortunately, frequency hopping alone cannot reduce the interference to an acceptable level when two or more radios, operating at the same time and/or on the same (or nearby) channel, come within close proximity to one another. As used herein, the term "close proximity" refers to a distance, which separates two or more co-located radios and results in an unacceptable level of interference when the radios operate at the same time and/or on the same channel. Unacceptable levels of interference are typically defined by the communication protocols associated with the interfering radios. The term "co-located" is used herein to describe two or more radios that are located within the same wireless communication device, or alternatively, within different devices in close proximity to one another.

Some wireless device manufacturers have chosen to avoid interference through strict adherence to the communication protocols associated with certain wireless communication technologies. For example, some manufacturers will spatially separate co-located radios by a sufficient distance (relative to the wavelength of transmitted signals) to achieve an appropriate amount of attenuation/suppression of the transmit signal in the receive path. Since the impact of interference on system performance is primarily related to the power of the desired signal (or carrier signal) relative to that of the interfering signal, most communication protocols specify the spatial separation in terms of a carrier-to-interference level (C/I) ratio. The C/I ratio is measured in units of decibels (dB) and may be approximately +11 dB to −40 dB for some communication protocols. Depending on the wavelength of the transmit signal, the C/I ratio desired by some communication protocols may require co-located radios to be separated by as much as eight feet or more. Clearly, such a large separation between radio modules is simply not possible within most portable computing and telecommunication devices (e.g., portable PCs, PDAs, cell phones, etc.), due to the relatively small size of these devices.

Other manufacturers choose to avoid interference altogether by permitting only one radio module to operate at any given time. This technique, however, tends to place unnecessary limitations on the user's ability to run multiple applications at the same time such as, e.g., downloading and displaying information on a PDA display screen while discussing the downloaded information with a colleague using a hands-free connection to the PDA. Though once considered a luxury, simultaneous radio operation is becoming a highly desirable feature for today's consumers, and therefore, a necessity for manufactures who want to maintain a competitive edge in a fast-paced market.

A few manufactures have attempted to reduce the level of interference between radio modules located within portable computing and telecommunication devices, while enabling the radios to operate at substantially the same time. Unfortunately, these manufacturers generally do so by adding intelligence (in the form of hardware and/or software) to the radio modules so that they will "sense" each other and avoid interference-causing collisions as much as possible. In some cases, intelligence is added to filter or otherwise subtract the interference signal from the desired signal. These additions are not only complicated, but also tend to consume valuable power resources (a limited commodity and weight consideration) in most portable computing and telecommunication devices. Adding intelligence may also lead to undesirable increases in the size, weight and cost of the wireless communication device, sometimes without reducing interference to the levels accepted by some communication protocols.

Other manufacturers may attempt to reduce interference by manipulating the radiation pattern(s) of the antenna(s) within co-located radio modules. For example, an antenna within an interfering radio module may be designed with directional properties to reduce interference by directing a substantial portion of the electromagnetic radiation away from a co-located radio in module. Unfortunately, the use of directional antennas (often referred to as "antenna arrays" or "beam steerers") tends to increase the size, weight, cost, complexity and power consumption of the radio module, sometimes without reducing the interference to an "acceptable" level. Large financial investments and lengthy learning curves may also be involved if a new antenna design is to be engineered for a specific combination or arrangement of radios within a particular wireless communication device. In the fast-paced world of telecommunications, lengthy development times may cause manufactures to miss narrow market windows, causing them to forfeit profits and/or market share to competitors.

Therefore, it would be beneficial to provide a improved means for reducing electromagnetic interference between two or more co-located radio modules operating at the same time and in the same (or nearby) frequency band. Such means would preferably provide a low-cost, simple solution to the interference problem created within wireless communication devices, while conserving the power efficiency of a transmitting radio module, maintaining the integrity of a transmitted signal, and minimizing the size and weight of the wireless communication device.

SUMMARY OF THE INVENTION

The problems outlined above may be in large part addressed by an apparatus for reducing electromagnetic interference between a pair of antennas attached to a wireless communications device. In general, a wireless communication device may include any device enabled for wireless communications (i.e., for transmitting/receiving audio, video and/or data signals over a wireless medium). For example, a wireless communication device may include (or be included within) a server, a desktop computer, a notebook computer, a tablet computer, a hand-held organizational and/or computational device, a mobile telephone or a combination thereof. A wireless communication device may also be included within a personal or public transportation system, such as a car, a bus, a train, a plane, etc. In a preferred embodiment, the wireless communication device may include at least two radio modules for transmitting/receiving signals via the pair of antennas.

As will be described in more detail below, interference often occurs whenever a radio receives, in addition to a desired signal, the signals from other radios transmitting within the same (or a nearby) radio frequency band. For interference to become a problem within a single wireless communication device, the device must include at least two co-located antennas, one for each radio module. As used herein, the term "co-located" may describe two or more radio modules located within the same wireless communication device, or alternatively, within different devices located in close proximity to one another. The term "close proximity" may then refer to a distance, which separates two or more co-located radio modules and results in an unacceptable level of interference when the radios are simultaneously operated within the same (or nearby) radio frequency band.

In some embodiments, the wireless communication device may include a first antenna for transmitting a first signal within a first frequency band, and a second antenna for operating within a second frequency band during transmission of the first signal. The first and second frequency bands are generally dependent on the wireless communication protocol (s) used by the associated radio modules, and therefore, should not be limited to any particular band(s) within the radio frequency (RF) spectrum. In some cases, the first and second frequency bands may be substantially identical. In other cases, the first and second frequency bands may overlap one another, or may occupy nearby radio frequency channels. In either case, interference may occur when electromagnetic energy radiated from one of the antennas is received by the other antenna.

To reduce a radiated component of the electromagnetic interference, the wireless communication device may include an apparatus specifically designed for intercepting the electromagnetic energy radiated from one of the antennas and scattering the intercepted energy away from the other antenna. As will be described in more detail below, the apparatus may be specifically designed for intercepting and scattering the radiated components of the electromagnetic energy. More specifically, the apparatus may be designed for intercepting and scattering the radiated components, which propagate along a surface of the wireless communications device at a carrier frequency of the transmitted signal. The apparatus may also scatter other frequencies that fall within a relatively wide range of band-gap frequencies.

In a general embodiment, the apparatus may be positioned between the first and second antennas for intercepting the radiated energy components. For example, the apparatus may be positioned proximate to the second antenna, in some cases. At this position, the apparatus may reduce the interference at the second antenna by intercepting the electromagnetic energy radiated from the first antenna (e.g., during transmission of the first signal) and scattering the intercepted radiated energy away from the second antenna. To reduce interference at the second antenna, the apparatus is preferably formed to include a plurality of resonant circuit elements, each of which may resonate at (or near) a carrier frequency of the transmitted signal for redirecting at least a portion of the electromagnetic energy away from the second antenna. The apparatus may also function to reduce interference at the first antenna by intercepting the electromagnetic energy radiated from the second antenna (e.g., during transmission of a second signal) and scattering the radiated energy away from the first antenna.

In a particular embodiment, the plurality of resonant circuit elements may reduce interference by forming a periodic surface that resonates with the electromagnetic energy radiated from one of the antennas to produce a plurality of standing wave patterns, which then combine to redirect at least a portion of the electromagnetic energy away from the other antenna. In some cases, the plurality of resonant circuit elements may be specifically designed (with capacitive and inductive portions) to produce the plurality of standing wave patterns at about the carrier frequency of the first signal. If one or more of the antennas use different transmission frequencies, however, the plurality of resonant circuit elements are preferably designed to produce standing wave patterns at the lowest carrier frequency used by the antennas.

In one preferred embodiment, the apparatus is configured to resonate by setting various dimensions of the apparatus to some fraction of a wavelength of the transmitted signal. To optimize the reduction in interference, a length of the apparatus may be approximately equal to one-half of the transmission signal wavelength. Other dimensions of the apparatus may be considerably less than one transmission signal wavelength. In some cases, the other dimensions may be less than one-tenth of the transmission signal wavelength. In other cases, the other dimensions may be less than one-twelfth to one-sixteenth of the transmission signal wavelength. In any case, the combined operation of the plurality of resonant circuit elements may enable the apparatus to operate over a relatively wide range of band-gap frequencies.

In some cases, the relatively wide range of band-gap frequencies may include the carrier frequency of the transmitted signal and may extend approximately two to three octaves above the carrier frequency. If the carrier frequency of the transmitted signal is equal to about 2.4 GHz, for example, the range of band-gap frequencies may extend from about 2.3 GHz to about 9.6 GHz. In some cases, the range of band-gap frequencies may include a second carrier frequency, which along with the carrier frequency, may be used by a dual-band radio module for transmitting/receiving signals via the first antenna. In some cases, the range of band-gap frequencies may also include a third carrier frequency, which may be used by another radio module for transmitting/receiving signals via the second antenna.

The apparatus may be formed from an electrically conductive material. In some cases, the conductive material may be selected from substantially any metal or metal alloy. In most cases, however, the conductive material is preferably selected from an assortment of ferrous-based materials, since a primary goal of the apparatus is to reduce the radiated (or magnetic) component of an incoming electromagnetic wave. In some cases, conductive materials within a particular range of relative permittivity and relative permeability values may be chosen to effectively reduce the magnetic components of the electromagnetic wave. For example, the selected material may have a relative permittivity ($\epsilon_r$) of about 0.0 F/m to about 1.0 F/m. Additionally, the selected material may have a relative permeability ($\mu_r$) of about 10 H/m to about 100,000 H/m.

In some embodiments, the apparatus may be formed from a thin strip of metal, which has been stamped and folded into a plurality of rectangular elements connected to and arranged above a common reference plane by a plurality of vertical segments. During operation, the rectangular elements, vertical segments and common reference plane may combine to form the plurality of resonant circuit elements. In some cases, a lower surface of the plurality of rectangular elements may be separated from an upper surface of the common reference plane by a dielectric material. In another embodiment, the thin strip of metal may be stamped and folded into a plurality of A-shaped elements separated by a plurality of horizontal segments. During operation, the plurality of A-shaped elements and horizontal segments may combine to form the plurality of resonant circuit elements. In yet another embodiment, the thin strip of metal may be stamped and folded into a plurality of domed segments separated by a plurality of slots. During operation, the plurality of domed segments and slots may combine to form the plurality of resonant circuit elements. As an alternative to stamping, the apparatus of the above embodiments may be laser or chemically etched from the thin strip of metal.

In other embodiments, the apparatus may be formed from an elongated metal structure, which has been molded to form a plurality of vertical elements, which are periodically coupled to a common reference plane at various locations. During operation, the plurality of vertical elements and various locations may combine to form the plurality of resonant circuit elements.

A method is also disclosed herein for reducing the electromagnetic interference between two or more antennas coupled to a wireless communication device. As noted above, electromagnetic interference may occur at a second antenna due, in part, to the close proximity of the second antenna to a first antenna.

Such a method may begin by coupling the first antenna and the second antenna to a surface of the wireless communications device. In most cases, the first and second antennas may be spaced from each other by a "relatively short distance," or a distance that allows electromagnetic energy radiated from the first antenna to interfere with a substantially concurrent operation of the second antenna. In general, the relatively short distance may depend on a wavelength of a transmitted signal and a dimension of the surface upon which the first and second antennas are integrated. In some cases, the dimension may be less than or equal to about 1 meter.

In some cases, the step of coupling the first and second antennas may comprise attaching the first and second antennas to an external surface of the wireless communication device. In other cases, the step of coupling the first and second antennas may comprise attaching the first and second antennas to internal components of the wireless communication device, where the internal components are surrounded, at least in part, by a substantially non-conductive external surface. In other cases, the step of coupling the first and second antennas may comprise attaching the first and second antennas to an expansion card or sub-assembly, which is detachably coupled to the wireless communication device.

The method may also comprise a step for transmitting a signal by radiating electromagnetic energy from the first antenna. In most cases, the electromagnetic energy may be radiated using any radiation pattern and/or transmission power level. The electromagnetic energy radiated from the first antenna may then propagate through free space as a plane wave having minimum and maximum electromagnetic energy levels at various locations along the surface to which the antennas are attached. The various locations may generally correspond to fractional amounts of the transmission signal wavelength.

In some cases, the step of coupling the first and second antennas may also comprise spacing the second antenna from the first antenna, such that a receiving end of the second antenna is positioned at the furthest location of minimum electromagnetic energy available along the surface. In one embodiment, the furthest location of minimum electromagnetic energy may be spaced approximately one transmission signal wavelength away from a transmitting portion of the first antenna.

In order to reduce electromagnetic interference between the first and second antennas, the method may also comprise a step for coupling the apparatus to the wireless communication device. In some cases, the step of coupling the apparatus may comprise arranging the apparatus between the first and second antennas, such that a center of the apparatus is positioned at a location of maximum electromagnetic energy. In one embodiment, the location of maximum electromagnetic energy may immediately precede the furthest location of minimum electromagnetic energy, so that the center of the apparatus is spaced from the transmitting portion of the first antenna by approximately three-fourths of the transmission signal wavelength. In another embodiment, the location of maximum electromagnetic energy may immediately follow a first location of minimum electromagnetic energy, so that the center of the apparatus is spaced from the transmitting portion of the first antenna by approximately one-fourth of the transmission signal wavelength. In some cases, the step of coupling the apparatus may comprise attaching the apparatus to the same surface upon which the antennas are attached. In other cases, however, the step of coupling the apparatus may comprise attaching the apparatus to a covering, which may be connected to the surface for protecting and/or concealing the first and second antennas.

Upon intercepting the electromagnetic energy radiated from the first antenna, the step of coupling the apparatus may enable at least a portion of the electromagnetic energy propagating toward the second antenna to be redirected away from the second antenna. More specifically, the apparatus may be provided with a periodic surface that resonates with the electromagnetic energy radiated from the first antenna to produce a plurality of standing wave patterns. The standing wave patterns may combine to redirect the portion of the electromagnetic energy away from the second antenna.

In some cases, the redirected portion may include approximately 50% to 80% of the electromagnetic energy radiated from the first antenna. The redirected portion may also fall within the relatively wide range of band-gap frequencies encompassing, and extending approximately 2 to 4 octaves above, the carrier frequency of the transmitted signal. In some cases, the relatively wide range of band-gap frequencies may include substantially all frequency bands, which are used by one or more radio modules of the wireless communication device for transmitting/receiving radio frequency signals via the first and second antennas.

By redirecting or scattering the radiated energy, the present method may reduce interference at the second antenna while conserving the energy radiated from the first antenna, and vice versa. In other words, the steps of providing the apparatus and coupling the apparatus may enable electromagnetic interference to be reduced without absorbing the electromagnetic energy radiated from the first antenna or decreasing a transmission power level of the transmitted signal. In some embodiments, the steps of providing the apparatus and coupling the apparatus may also provide an insertion loss of about −25 dB to about −35 dB between the first and second antennas. This insertion loss may be provided throughout the entire range of band-gap frequencies.

BRIEF DESCRIPTION OF THE DRAWINGS

Other objects and advantages of the invention will become apparent upon reading the following detailed description and upon reference to the accompanying drawings in which:

FIG. 1 is a table illustrating various wireless communication networks and various wireless communication technologies (or specifications) associated with those networks;

Figure 2:
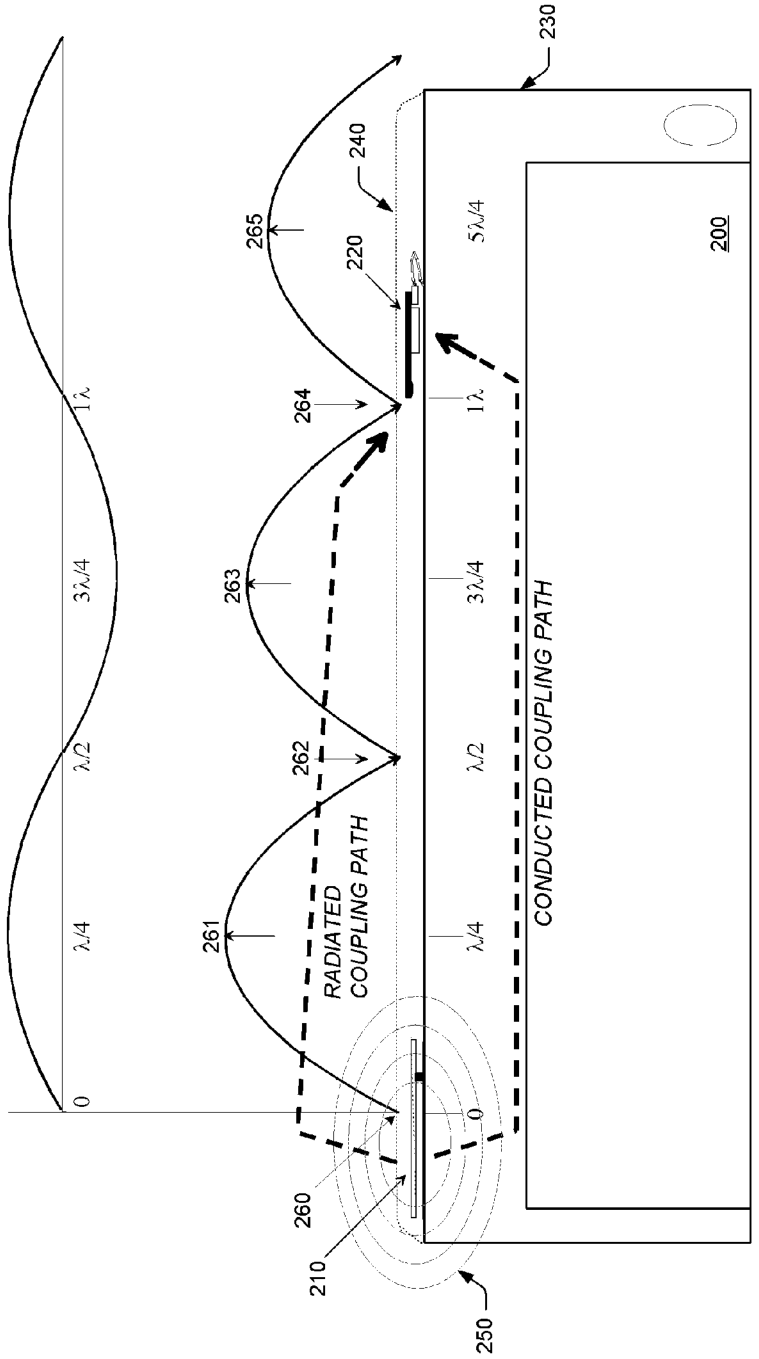
FIG. 2 is a side view of an exemplary wireless communications device illustrating the radiated and conducted electromagnetic coupling paths that may exist between two radio modules, which are coupled to the communications device in accordance with one embodiment of the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

A current trend in wireless telecommunications is the integration of two or more wireless communication technologies within a single communications device. For example, PDA manufacturers have been adding WWAN (e.g., GSM/PCS and GPRS) and WLAN (e.g., IEEE 802.11b and HomeRF™) capabilities to their portable computing devices, thereby enabling the devices to transmit voice communications, in addition to providing broadband wireless access in corporate/home environments and WLAN hotspots. Computer manufacturers have also been adding WLAN (e.g., IEEE 802.11b and HomeRF™) and WPAN (e.g., Bluetooth™) capabilities to portable PCs, providing broadband access to WLANs and wireless connectivity to a growing number of WPAN-equipped devices. By combining two or more different communication technologies, the consumer is afforded greater mobility, accessibility and versatility within a single communication device.

Chart 100 of FIG. 1 illustrates a few examples of currently available wireless communication technologies, some of which may be combined within a single wireless communication device to support a variety of applications. As shown in FIG. 1, the radio frequency (RF) band within which a particular wireless communication technology operates is usually dependent on the application and/or network to which it is associated. For example, WWAN technologies generally operate within the 900/1800 MHz or the 1850-2200 MHz bands, whereas WLAN and WPAN technologies generally operate within the 2.4-2.5 GHz and 5.0-6.0 GHz bands. The maximum speed and range of a particular wireless communication technology may also be dependent on the application and/or network to which it is associated. For example, WLAN technologies are generally faster (i.e., provide higher bit rates) than most WWAN and WPAN technologies, but fall between WWAN and WPAN technologies in the operational range category.

As shown in FIG. 1, many of today's wireless communication devices operate in the unlicensed Industrial, Scientific and Medical (ISM) band, which in general, includes the 2.4 GHz and 5.0 GHz radio frequency bands. While all such devices are allowed to use the same frequency band, each device may have its own air interface, communication protocols, and applications. In recent years, the ISM band has become increasingly crowded, as wireless communication devices proliferate due to the unlicensed usage allowed by FCC part 15 regulations. In some cases, mandatory use of spread-spectrum technologies (i.e., "frequency hopping" schemes) has made it possible for different wireless communication devices to co-exist by controlling the channel and duration over which each device is allowed to operate. However, frequency hopping schemes alone cannot reduce interference to "acceptable levels" when two or more radios (operating, e.g., within overlapping frequency bands) come within close proximity to one another. More importantly, frequency hopping schemes tend to fail when co-located radios reside within the same communication device. Though several solutions have been proposed for reducing or even avoiding such interference, none have managed to solve the problem without restricting radio operation or significantly increasing the complexity, size, weight, cost and power consumption of the wireless communication device; all of which place undesirable limitations on portable computing and telecommunication devices.

For this reason, an improved means is provided herein for reducing the interference between two or more radios located within, or otherwise closely coupled to, a wireless communication device. Various principles will be described throughout this disclosure for enabling two or more co-located radio modules to operate concurrently within the same, or nearby, radio frequency bands. By applying these principles, almost any combination of wireless communication technologies can be included within a single communication device without risking degraded performance from one, the other, or both of the radios modules. Though the following disclosure primarily focuses on the combination of WLAN and WPAN technologies, and more specifically, on the combination of radio modules operating at approximately 2.4 GHz according to IEEE 802.11b (otherwise known as "WiFi") and Bluetooth™ standards, the principles described herein may be successfully applied to other radio frequencies and/or other communication protocols.

FIG. 2 illustrates one embodiment of an improved means for reducing the interference between a pair of radio modules located within, or otherwise closely coupled to, a wireless communication device. In the embodiment of FIG. 2, radio modules 210 and 220 are coupled along one side of wireless communication device 200. In general, wireless communication device 200 may comprise any computing and/or telecommunications device, which is capable of transmitting and/or receiving audio, video and/or data signals over a wireless medium. For example, wireless communication device 200 may be a non-portable computing device (e.g., a server, a desktop computer, a cordless keyboard, a cordless printer, a cordless mouse, etc.) or a mobile telecommunication device (e.g., a GPS device, AM/FM broadcast radio, satellite broadcast radio, satellite assisted navigation, satellite roadside assistance and other intra-vehicular or intra-aircraft telecommunications). However, the principles described herein may be particularly applicable to portable computing and/or telecommunication devices (e.g., a portable PC, PDA, cell phone, etc.), due to the inherent difficulty in reducing the interference between radio modules residing within these relatively small devices. For the sake of brevity, the following discussion will assume that wireless communication device 200 is a portable PC, such as a tablet computer. However, wireless communication device 200 is not limited to a tablet computer, and may comprise any other wireless communication device currently known in the art or made available in the future.

In the embodiment of FIG. 2, radio modules 210 and 220 are coupled to an external surface 230 of tablet computer 200. In particular, radio modules 210 and 220 are fixedly attached to a right-hand side of external surface 230. Though not specifically illustrated in FIG. 2, radio modules 210 and 220 may be attached to external surface 230 by substantially any means known in the art (e.g., by screws, clamps, adhesives, etc.). In some cases, external surface 230 comprises an outer frame for supporting and/or encasing the internal components of tablet computer 200. In some cases, the outer frame may be constructed from a metal or metal-alloy material, so as to maximize the structural integrity of computer 200. However, one of ordinary skill in the art would recognize how the function and/or composition of external surface 230 may be changed (e.g., the external surface may be formed from a substantially less conductive material), in other embodiments of the invention. In some cases, an outer covering 240 may be attached to external surface 230 for protecting and/or concealing radio modules 210 and 220 from the environment. Outer covering 240 may be, for example, a plastic cover fixedly or detachably connected to external surface 230. In addition to plastic, outer covering 240 may be formed from substantially any other non-conductive material, so as to avoid obstructing radio operation.

In the embodiment of FIG. 2, radio modules 210 and 220 are coupled on the same side of wireless communication device 200. However, the radio modules are not limited to the arrangement shown in FIG. 2, and may be coupled differently in other embodiments on the invention. For example, radio modules 210 and 220 may be fixedly attached to a left-hand side of external surface 230, or alternatively, to a top, bottom, front or back side of external surface 230. Radio modules 210 and 220 may also be coupled to tablet computer 200 on different sides (e.g. on the right-hand and left-hand sides) of external surface 230. In addition to various aesthetic and/or ergonomic design principles, the preferred arrangement of the radio modules on the external surface may be based, in part, on the material composition of the external surface, the size of the external surface, and possibly other industrial design aspects. Though the arrangement of FIG. 2 is chosen for illustrative purposes, the electromagnetic interference between two radio modules is often strongest when the radio modules are coupled on the same side of wireless communication device 200.

Though not specifically illustrated in FIG. 2, radio modules 210 and 220 may include one or more components in addition to those shown. For example, radio modules 210 and 220 may include one or more of the following: pre-selectors, pre-detectors, front-end amplifiers, mixers, filters, local oscillators, demodulators, and tuners, among other things. In some embodiments, one or more components of radio modules 210 and 220 may be integrated within tablet computer 200. If the antenna is separated from the radio module, for example, the antenna may be attached to (or formed as a part of) the external surface of computer 200. The antenna may then be coupled by a short lead to a radio module residing within computer 200. In some cases, it may be possible to integrate all radio module components within computer 200, if at least a portion of the external surface is formed from a substantially non-conductive material (i.e., a material that would not significantly impede radio operation). In other embodiments, one or more components of radio modules 210 and 220 may be detachably coupled to tablet computer 200. For example, one or more components of radio modules 210 and 220 may be integrated onto an expansion card (e.g., a PCI card) or some other removable module, which can be "plugged in" to an external port of computer 200. Regardless of whether radio modules 210 and 220 are fixedly attached to external surface 230, integrated within tablet computer 200, or detachably coupled to tablet computer 200, consideration should be made as to the arrangement of the radio modules relative to one another. Such arrangement will be described in more detail below.

During operation, radio module 210 may transmit a radio frequency signal by radiating electromagnetic energy into the surrounding area. In general, radio frequency signals are transmitted by supplying electrical current to an antenna; the electrical current is converted into electromagnetic energy by inducing the antenna to oscillate at a particular frequency (or frequencies) known as the "resonant frequency." As will be described in more detail below, the resonant frequency of an antenna may be set to the intended carrier frequency of a given radio module by carefully balancing the capacitive and inductive portions of the antenna.

Figure 3:
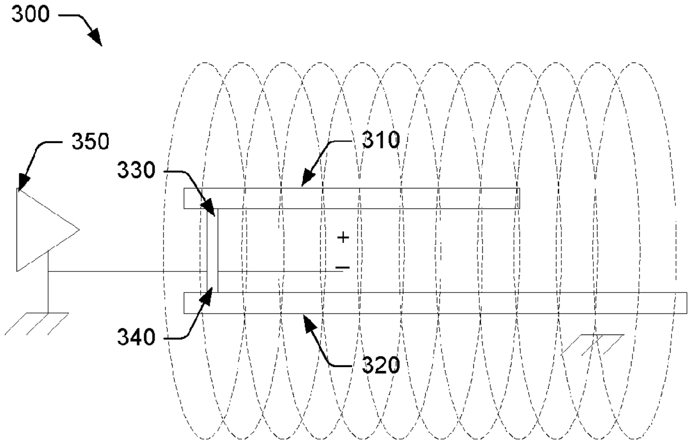
FIG. 3 is a block diagram illustrating an exemplary antenna design that may be used by one or more of the various wireless communications technologies of FIG. 1.

Antennas are often referred to as "active radiators" since power must be supplied to the antenna to induce oscillations. FIG. 3 illustrates one embodiment of an active radiator, or antenna, which may be used to transmit radio frequency signals. In general, antenna 300 includes antenna element 310, ground plane 320, feed point 330 and short point 340. In FIG. 3, antenna element 310 is arranged above and coupled to ground plane 320 through feed point 330 and short point 340. In some embodiments, antenna 300 may use a quarter-wave antenna element 310 to provide maximum electromagnetic disturbance at the intended carrier frequency of radio module 210. As such, antenna 300 may be referred to as a "quarter-wave antenna." In a preferred embodiment, antenna 300 comprises an inverted-F (or PIFA) quarter-wave antenna; a popular choice in portable PCs due to the antenna's overall performance, ease of integration, simple design and low cost. The inverted-F antenna may also be desirable for it's substantially small size and omni-directional radiation pattern.

Other antenna designs and/or sizes may be chosen in other embodiments of the invention. For example, the inverted-F antenna described above may be modified to include an antenna element, whose length is substantially less than or greater than a quarter wavelength. Alternative antenna designs that may be integrated into tablet computer 200 include: monopole antennas, dipole antennas, sleeve dipole antennas, helical antennas, patch antennas, slot antennas, and synthesized aperture (SA) antennas. In some cases, an antenna may be specifically designed for radiating most of it's electromagnetic energy in a particular direction and/or with a particular polarization (e.g., horizontal, vertical, circular, etc.). Directional antennas are sometimes referred to as "antenna arrays" or "beam steerers," and typically include a plurality of identical antenna elements that are equally spaced and similarly oriented; beam steering and pattern control are achieved by means of phase shifters next to each element. However, an antenna with a simple omni-directional radiation pattern (such as the inverted-F antenna) may be preferred in most embodiments of the invention, due to the large size, complexity, cost and power consumption typically associated with directional antenna designs.

As shown in FIG. 3, a radio frequency driver 350 (included within, e.g., radio module 210) may be coupled to antenna 300 for supplying the electrical current to feed point 330. Radio frequency driver 350 may be configured to operate at the intended carrier frequency (e.g., about 2.4 GHz) of radio module 210, or a grouping of several nearby frequencies (e.g., about 2.400 GHz to about 2.450 GHz). To set the resonant frequency of antenna 300 to the carrier frequency of radio module 210, antenna 300 must be carefully designed so that the frequency-dependent reactances (i.e., the imaginary impedance through antenna element 310 and the imaginary impedance between antenna element 310 and ground plane 320) are substantially equal in magnitude. When this occurs, the current through the antenna will be at a maximum value when power is supplied to the antenna.

In an ideal situation, most of the power supplied to an antenna is radiated when the antenna is operating at resonance. Unfortunately, real antennas suffer from real power losses that decrease the overall power efficiency of the antenna. In some cases, for example, nearby metal objects may "load" an antenna, thereby decreasing the effective impedance and increasing the current through the antenna to decrease power efficiency. Power efficiency may also be decreased for antennas with relatively high Voltage Standing Wave Ratios (VSWR), i.e., relatively high impedance mismatches between the antenna and its perceived load. As the VSWR value increases, more of the transmitted signal may be reflected back to the RF amplifier to decrease the power efficiency of the antenna. Power efficiency may also be decreased in antenna designs having elements that are less than ¼ wavelength. These designs provide lower power efficiencies by radiating less power into space at a given signal level.

Figure 4:
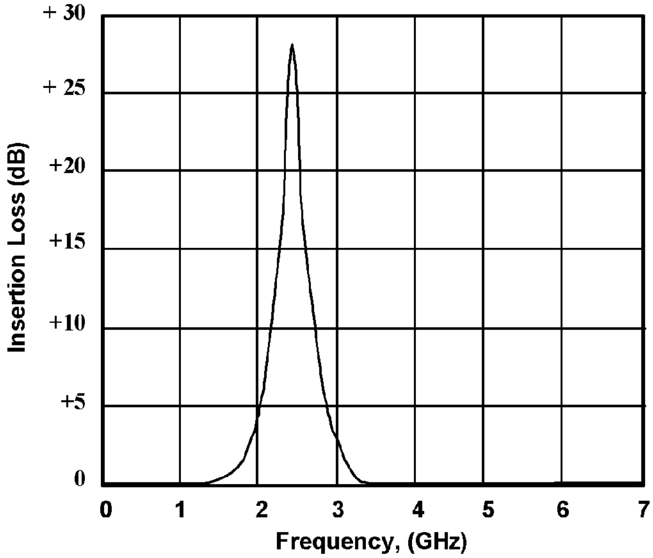
FIG. 4 is a graph illustrating a typical insertion loss (dB) provided by the antenna design of FIG. 3 over a range of frequencies (GHz)

One way of expressing antenna power efficiency is in terms of "insertion loss" or the power loss (measured in units of decibels, dB) of a signal as it travels through one or more passive components. For example, an antenna with high radiative power efficiency (e.g., about 75% to about 90%) would demonstrate a relatively high insertion loss (e.g., about +40 dB to about +60 dB) at the resonant frequency, or the frequency at which the current through the antenna is highest. On the other hand, an antenna with low radiative power efficiency (e.g., about 20% to about 40%) would provide a relatively low insertion loss (e.g., about +6 dB to about +15 dB) at the resonant frequency. FIG. 4 illustrates a typical insertion loss for a 2.4 GHz inverted-F antenna over a range of frequencies. As shown in FIG. 4, the highest insertion loss (i.e., approximately +28 dB) occurs at the resonant frequency (i.e., approximately 2.42 GHz) of the inverted-F antenna.

Most of the antenna designs incorporated into today's wireless communication devices provide approximately +20 dB to +35 dB insertion loss, or approximately 20% to 80% power efficiency in free-space operation. However, antenna power efficiency often changes once the antenna is incorporated into a wireless communication device. In fact, the actual power efficiency of an antenna may depend on several factors including, but not limited to: the radiation pattern produced by the antenna element, the efficiency with which radiated energy is reflected from the ground plane, and the internal dielectrics of the antenna. As noted above, the VSWR of the antenna and the environment in which the antenna is placed may also affect the antenna power efficiency. In one embodiment, the power efficiency of (inverted-F) antenna 300 may be approximately 70% (or above) in free-space operation or between approximately 60-70% when incorporated into a lossy system, such as wireless communication device 200.

Though antenna radiation patterns and ground plane reflections may affect antenna power efficiency to some degree, the greatest affect is often provided by the environment in which the antenna is placed. For example, the antenna power efficiency is usually decreased when the antenna is placed in the vicinity of an electrically conductive surface (or a metal object). Consider the case in which radio module 210 is coupled to the electrically-conductive external surface 230 of tablet computer 200. During operation of radio module 210, electromagnetic energy is produced in the form of an electromagnetic wave having both electric (E) and magnetic (H) components. The magnetic component radiated from the antenna element of radio module 210 interacts with the antenna ground plane of radio module 210 to induce an electric field within the ground plane. This may cause surface currents to propagate along the ground plane and into external surface 230. As a result, a large portion (e.g., up to 50%) of the initial electromagnetic energy may be lost, due to conductive coupling of the energy into the electrically-conductive external surface of tablet computer 200. In other words, antenna power efficiency may be initially decreased by an amount proportional to the energy lost to conductive coupling.

After losing considerable power through the ground plane, the electromagnetic energy radiated from the transmitting antenna may still attempt to couple into any of the conductive surfaces encountered on it's way out of the wireless communication device. If the antenna is left exposed, or concealed by a substantially non-conductive surface (such as, e.g., outer covering 240 of FIG. 2), portions of the radiated electromagnetic energy may couple into electrically-conductive external surface 230 at periodic locations along the external surface. Over time, the portions of energy lost to radiated coupling will further decrease the antenna power efficiency (e.g., by another 25%). In some cases, the total power loss may be as much as 75% when a transmitting antenna is placed in the vicinity of electrically-conductive external surface 230. Since a minimum power level is required to successfully receive the transmitted signal, it is often desirable to conserve the small amount of energy remaining after conductive and radiative losses.

Due to the relatively small separation between radio modules 210 and 220, some of the conductive and radiative losses will be received at radio module 220. If radio module 220 operates within the same time period and within the same (or a nearby) radio frequency band as radio module 210, the conductive and radiative losses will be received as interference. In some cases, interference may be quantified by measuring the conductive and radiative losses at a particular location, such as the receiving end of radio module 220. In other words, interference may be quantified by measuring the insertion loss between the transmitting antenna and a nearby antenna. High levels of interference are generally characterized by relatively low insertion loss values (e.g., about −1 dB to about −15 dB), whereas low levels of interference are characterized by relatively high insertion loss values (e.g., about −20 dB to about −40 dB or more).

Most wireless communication protocols specify a maximum level of interference for maintaining "acceptable" radio performance. "Acceptable" interference levels are generally designated as an acceptable ratio of the carrier signal (C) power level to the interference signal (I) power level. Such a ratio is commonly referred to as the C/I ratio, and is measured in units of decibels (dB). In some cases, the specified C/I ratios may be expressed in terms of insertion loss if the interference signal power level is measured at the affected radio in the absence of a carrier signal.

Assume, for example, that IEEE 802.11b (or "WiFi") and Bluetooth™ protocols are incorporated into tablet computer 200. In some cases, radio module 210 may utilize IEEE 802.11b (or "WiFi") protocols for long-range communication (up to about 100 meters) to a Wireless Local Area Network (WLAN), whereas radio module 220 may utilize Bluetooth™ protocols for short-range communication (up to about 10 meters) to a Wireless Personal Area Network (WPAN). It is noted, however, that radio modules 210 and 220 are not limited to the IEEE 802.11b and Bluetooth™ protocols, and may operate according to other communication protocols in alternative embodiments of the invention. The following discussion focuses on the IEEE 802.11b and Bluetooth™ protocols for the sake of brevity only.

Figure 5:
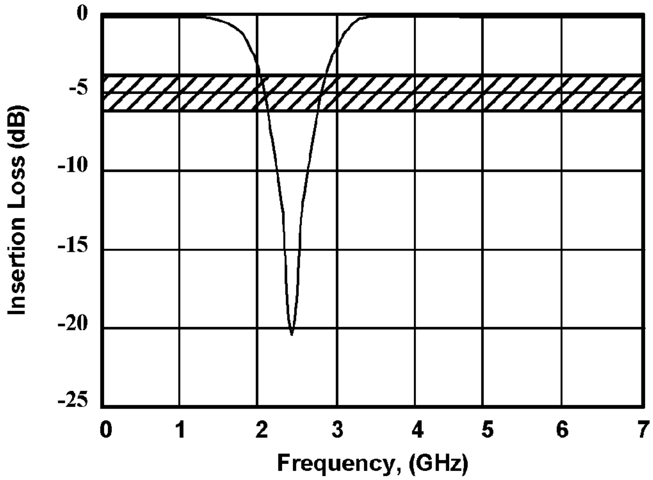
FIG. 5 is a graph illustrating an average insertion loss (shaded region, dB) measured at a nearby radio module placed a random distance away from the antenna of FIG. 3, and a typical insertion loss (dB) that may be obtained by arranging the radio modules as shown in FIG. 2.

In the relatively small confines of tablet computer 200, the insertion loss between the transmitting and nearby antennas may be as low as −3 dB when IEEE 802.11b radio module 210 and Bluetooth™ radio module 220 reside on the same side of external surface 230, as shown in FIG. 2. FIG. 5 illustrates an average range of insertion loss values (e.g., −3 dB to −6 dB) that may be obtained at radio module 220 during operation of radio module 210 (or vice versa). Unfortunately, an insertion loss of −10 dB can produce enough interference to significantly impair radio operations. For example, one measure of radio performance is referred to as transmission "throughput," or the amount of data successfully moved from one place to another in a given time period. In some cases, transmission throughput may be reduced by approximately 80-90% when insertion loss values fall below −10 dB (e.g., when IEEE 802.11b and Bluetooth™ radios come within 100 mm or less of one another).

For data applications, some manufacturers prefer to simply "tough it out" and let the retransmit protocol get the data over the channel. However, the error detection schemes used by IEEE 802.11b and Bluetooth™ may be overpowered by data errors and fooled into passing along erroneous data to upper-level protocols and user-level applications. However, relying on the retransmit protocol is not an option for most analog voice (i.e., audio) applications, because there is simply no data to retransmit. Though digital voice applications may utilize retransmit protocols, interference may lead to decreased customer satisfaction due to "breaks" in the conversation. Consequently, interference tends to present a greater problem for voice applications, where a loss of more than 5% of the packets transmitted on a Bluetooth™ audio link causes noticeable degradation, with significant impairment of audio quality occurring when failure rates exceed approximately 10%.

For this reason, Bluetooth™ protocols specify a C/I ratio of at least +11 dB for co-channel interference (i.e., interference produced when carrier and interference signals are transmitted on the same channel), and a C/I ratio of about −30 dB to −40 dB for adjacent channel interference (i.e., interference caused by spectrum spreading of signals transmitted on nearby channels). In some cases, the C/I ratio may be expressed as a "coupling ratio" of interference:carrier signal power levels. For example, a C/I ratio of −40 dB may be expressed as a 1:100 coupling ratio of interference:carrier signal power levels. In other words, a Bluetooth™ radio must receive less than 1% of the interference signal to maintain acceptable radio performance. Though specifications for other communication protocols have not yet been developed, the flexibility provided by the present invention will enable those specifications to ultimately be met.

In the absence of interference reducing means, the physical separation required to meet Bluetooth™ protocols (i.e., approximately 8 feet of separation to meet a C/I ratio of −40 dB) is often several times the size of a wireless communication device. In other words, the actual coupling ratio provided by most wireless communication devices falls considerably short of the recommended levels of interference, due to the relatively small size of most wireless communication devices, and thus, the limited distance within which the interfering and affected radio modules can be separated. As noted above, the available distance for separating the interfering and affected radio modules within the small confines of tablet computer 200 (e.g., about 30 cm on the same side and about 40 cm diagonally) may provide an average insertion loss of about −5 dB or less. When an interfering radio module (e.g., radio module 210) transmits at this distance, and within the same (or a nearby) frequency band as a nearby radio module (e.g., radio module 220), up to 45% of the transmitted signal level (dBuV) may be received at the nearby radio module. Such high levels of interference may be due, in part, to the multiple paths (i.e., the conductive and radiative paths) through which electromagnetic energy may be coupled into a receiver of the nearby radio module.

In some embodiments, interference may be reduced by decreasing the amount of energy coupled into radio module 220 via the conductive coupling path. For example, at least a portion of external surface 230 (e.g., the portion to which the antennas are coupled) may be formed from a substantially non-conductive material to reduce the surface currents within that portion. However, this embodiment may be undesirable, in some cases, if the use of a non-conductive material decreases the structural integrity of external surface 230. The amount of energy coupled into radio module 220 may also be decreased by adjusting a vertical position of radio module 220. For example, radio module 220 may be elevated slightly above external surface 230, or alternatively, may be arranged within a milled out portion of external surface 230, to reduce coupling with the conducted waves. Though vertical adjustments may improve insertion loss to some degree (e.g., by approximately −2 to −3 dB), such improvement may be limited by the physical constraints imposed by the system.

In a preferred embodiment, interference is significantly reduced by decreasing the amount of energy coupled into radio module 220 via the radiated coupling path. For example, the interference between radio modules 210 and 220 may be reduced by arranging radio module 220 at a location of minimum radiated energy. As shown in FIG. 2, at least a portion of the electromagnetic energy radiated from radio module 210 will propagate toward radio module 220 as a plane wave. Due to the inherent nature of wave propagation, the plane wave will periodically alternate between levels of minimum and maximum radiated energy at various locations along the external surface. The various locations are generally dependent on the wavelength of propagation (λ), which in the embodiment of FIG. 2, may be expressed as:

$$\lambda = \frac{c}{f_o} \qquad \text{[EQ. 1]}$$

where c is the speed of propagation through air (i.e., c≈3.0 m/s$^2$), and $f_o$ is the frequency of propagation (e.g., the resonant frequency of the transmitting antenna).

As shown in FIG. 2, the minimum levels of radiated energy (reference numerals 260, 262 and 264) may occur at various locations along the external surface, where the various locations are substantially equal to:

$$R_{MIN} = n\left(\frac{\lambda}{2}\right) \qquad \text{[EQ. 2]}$$

where n=[0, 1, 2 . . . ] and $R_{MIN}$ is a distance measured from a transmitting portion of radio module 210. In terms of frequency, the locations of minimum radiated energy may occur at about 1π, 2π, 3π and so on. At distances of approximately 4π or greater, far field propagation takes over to decrease the radiated energy by approximately $1/R^2$.

The maximum levels of radiated energy (reference numerals 261, 263 and 265) may also occur at various locations along the external surface, where the various locations are substantially equal to:

$$R_{MAX} = m\left(\frac{\lambda}{4}\right) \qquad \text{[EQ. 3]}$$

where m=[1, 2, 3 . . . ] and $R_{MAX}$ is a distance measured from a transmitting portion of radio module 210. In terms of frequency, the locations of maximum radiated energy may occur at about π/2, 3π/2, 5π/2 and so on.

To reduce the interference between radio modules 210 and 220, radio module 220 should be placed at the furthest location of minimum radiated energy available along the external surface of tablet computer 200. For example, a receiving end of radio module 220 may be placed at location 264 of FIG. 2, which represents the furthest location of minimum radiated energy available along the one side of external surface 230. In other words, the receiving end of radio module 220 may be separated from a transmitting end of radio module 210 by a distance substantially equal to one wavelength of the transmitted signal (e.g., about 124 mm for a 2.4 GHz signal). It is noted that even further locations of minimum radiated energy may be obtained in tablet computer 200 (e.g., by arranging radio modules 210 and 220 on different sides of external surface 230), or in somewhat larger wireless communication devices. With careful positioning of radio module 220, the insertion loss between radio modules 210 and 220 may be increased up to approximately −20 dB to −26 dB.

FIG. 5 illustrates an exemplary insertion loss (i.e., approx. −21 dB) that may be obtained by arranging radio modules 210 and 220 as shown in FIG. 2. In some cases, the insertion loss may be further increased by optimizing the height of the affected antenna above the external surface of tablet computer 200. For example, the insertion loss may be increased by approximately −2 to −3 dB if the affected antenna is raised by a small fraction of an inch (e.g., about 0.10" to about 0.20") above radio module 220. In some cases, a −10 to −15 dB improvement in insertion loss may be obtained (depending on system constraints) by decoupling the affected antenna. Unfortunately, the insertion loss values obtained by careful positioning of radio module 220 still fall short of the values specified by Bluetooth™ protocols.

Figure 6:
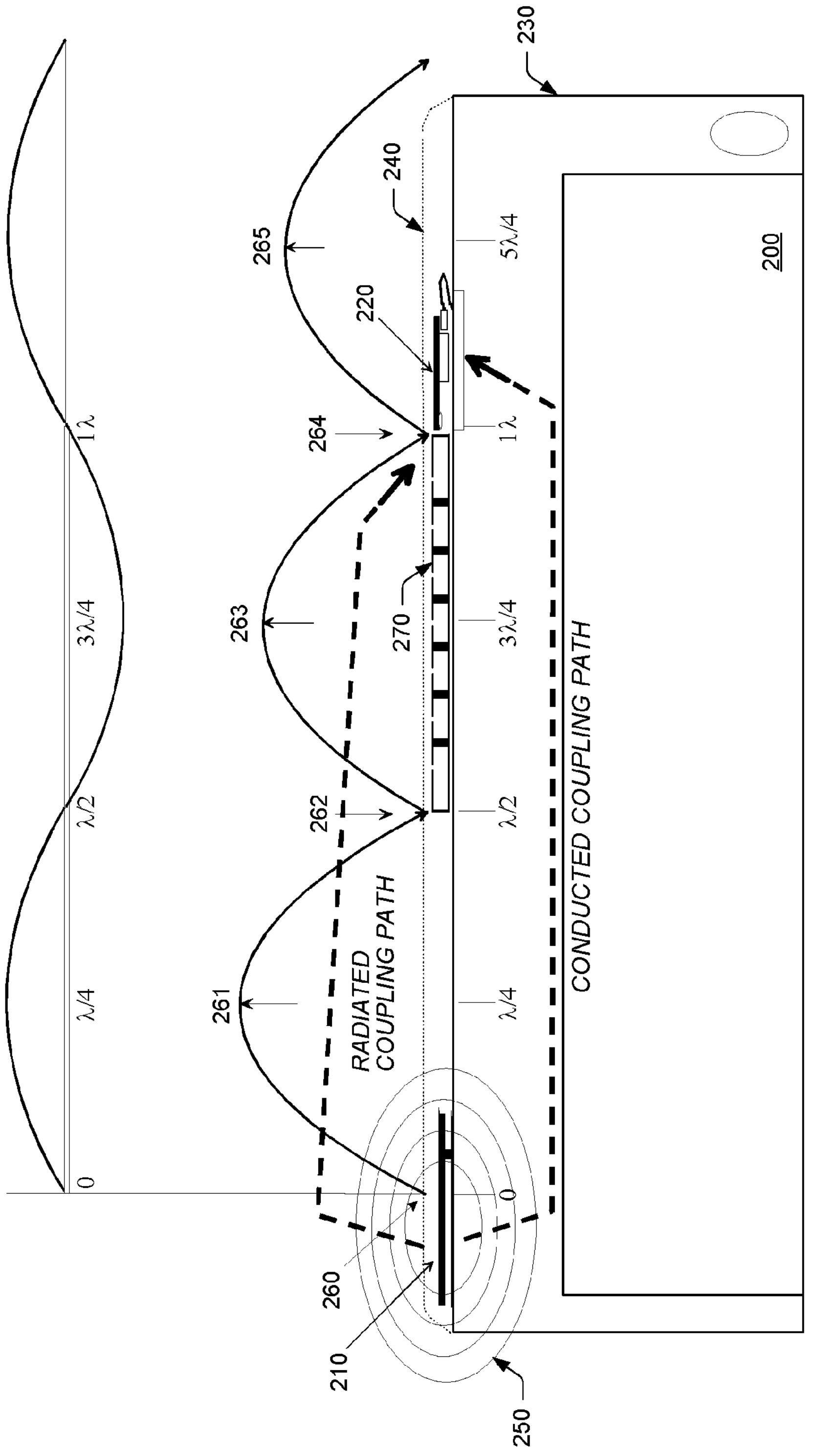
FIG. 6 is a side view of the wireless communications system of FIG. 2 illustrating one manner in which an apparatus may be arranged between a pair of radio modules for reducing the electromagnetic interference at one radio module when electromagnetic energy is radiated from the other radio module.

Additional interference reducing means are provided in FIG. 6 to further decrease the amount of energy coupled into radio module 220 via the radiated coupling path. Building upon the improvements of FIG. 2, apparatus 270 is positioned between radio modules 210 and 220, and in most cases, positioned proximate to radio module 220 for intercepting the electromagnetic energy radiated from radio module 210. This allows apparatus 270 to reduce the interference at radio module 220 by redirecting at least a portion of the radiated electromagnetic energy away from radio module 220. As described in more detail below, apparatus 270 generally functions as a "passive resonator," meaning that it resonates (or re-radiates) the electromagnetic energy intercepted from a relatively close radiative source (such as radio module 210). As a result of such passive operation, apparatus 270 may operate in the opposite direction when signals are transmitted from radio module 220. For example, apparatus 270 may reduce interference received at radio module 210 by intercepting and redirecting the electromagnetic energy radiated from radio module 220. Other advantages provided by apparatus 270 will be described in more detail below.

Various embodiments of apparatus 270 are provided in FIGS. 7 and 10-12. Though all embodiments are configured to reduce interference through passive re-radiation of the interference signal, some of the individual embodiments operate according to slightly different radiation theories. As such, apparatus 270 should not be limited to only those embodiments shown in FIGS. 7 and 10-12, but instead, should be considered to encompass any design that operates according to the radiation theories disclosed herein.

Similar to radio module 220, apparatus 270 should be carefully positioned between the radio modules to achieve a maximum reduction in interference. Unlike radio module 220, however, apparatus 270 should be centered at a location of concentrated wave energy, so that a majority of the radiated energy can be redirected by scattering the energy at its highest magnitude. In some cases, apparatus 270 may centered at location 263 of FIG. 6, or the location of maximum radiated energy immediately preceding radio module 220. In other words, a center of apparatus 270 may be separated from a transmitting end of radio module 210 by a distance that is substantially equal to three-quarters of the transmission signal wavelength (e.g., about 93 mm for a 2.4 GHz signal). However, apparatus 270 may be placed at other locations of maximum radiated energy, in other embodiments.

In general, apparatus 270 may provide the greatest protection when positioned directly in front of the weaker radio module. As used herein, the term "weaker" may refer to the transmission power level of a radio module, or in some cases, a communication protocol's inherent vulnerability to interference. Assume, for example, that radio module 210 operates according to 802.11 standards and radio module 220 operates according to Bluetooth™ protocols. In this scenario, radio module 210 may be considered the "weaker" radio, even though the transmission power level of radio module 210 may be ten times (or more) greater than the transmission power level of radio module 220. As such, the greatest protection may be provided by centering apparatus 270 at location 261 of FIG. 6, or the location of maximum radiated energy immediately following radio module 210. In other words, a center of apparatus 270 may be separated from a transmitting end of radio module 210 by a distance that is substantially equal to one-quarter of the transmission signal wavelength (e.g., about 31 mm for a 2.4 GHz signal).

Since the primary function of apparatus 270 is to reduce the radiated component of the electromagnetic energy, the arrangement of the apparatus can be somewhat flexible at the preferred location. For example, apparatus 270 may be attached to external surface 230 at the preferred location, as shown in FIG. 6. In another example, apparatus 270 may be flipped upside down and attached to the underside of outer covering 240 at the preferred location. It is noted that the apparatus may be attached to other surfaces when the antennas of radio modules 210 and 220 are not attached to external surface 230. In a preferred embodiment, a means for attaching apparatus 270 to the attachment surface (e.g., external surface 230) functions to electrically isolate the apparatus from other components of device 200 and enables the apparatus to resonate freely. For example, apparatus 270 may be attached by a non-conductive adhesive material (such as pressure sensitive adhesives and acrylate-based or thermoplastic glues) or a non-conductive attachment device (such as screws, clips, clamps or brackets formed from a polymeric material).

As noted above, apparatus 270 comprises a plurality of elements for scattering the radiated energy from an incoming electromagnetic wave. In order to effectively scatter the incoming energy, each of the elements are identically configured to resonate at or near the carrier frequency of a transmitted signal. The plurality of elements may then be arranged in a linear or array pattern to produce a plurality of standing wave patterns (at the resonant frequency) using the electromagnetic energy from the incoming wave. Due to the precise configuration and arrangement of the elements, the standing wave patterns constructively and destructively interfere with one another to modify the frequency and phase of the incoming wave. This enables some portion of the incoming wave energy to be absorbed in each element maintaining the resonance. As a result, the modulated energy components (which now fall within a relatively wide range of band-gap frequencies) are scattered away from the nearby radio module.

Figure 7A:
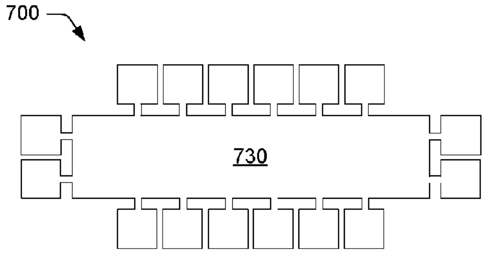
FIG. 7A is a top view illustrating an unfolded pattern of one embodiment of the apparatus shown in FIG. 6.
Figure 7B:
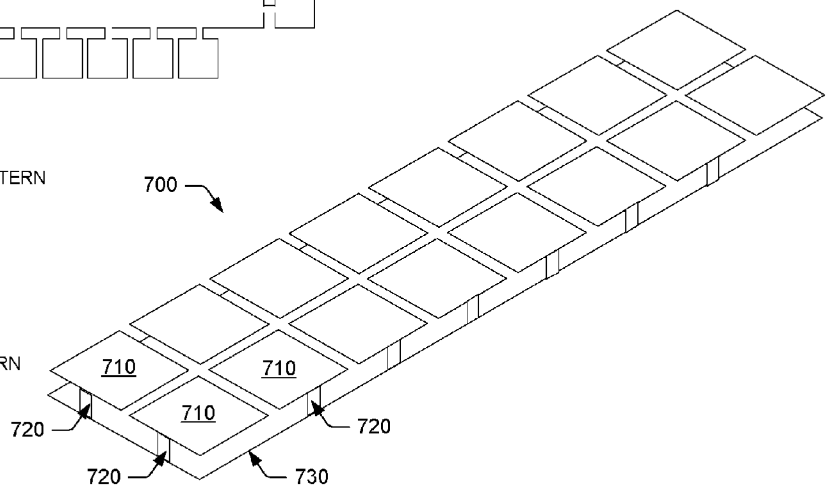
FIG. 7B is a rotated top view of an apparatus formed in accordance with the unfolded pattern of FIG. 7A.
Figure 7C:
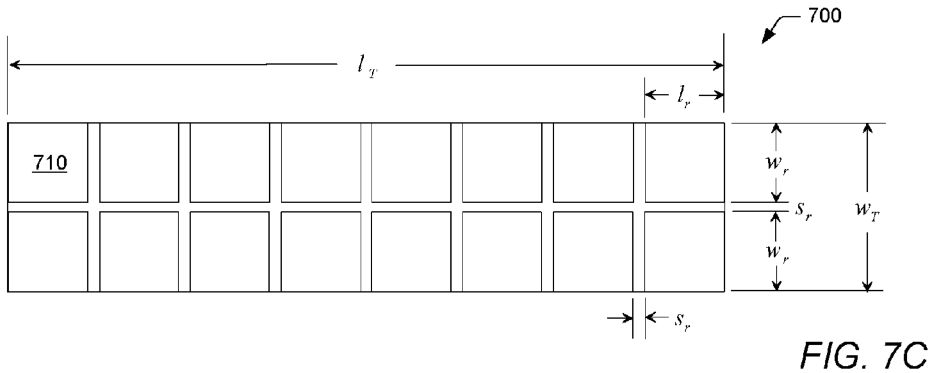
FIG. 7C is a top view of the apparatus of FIG. 7B.
Figure 7D:
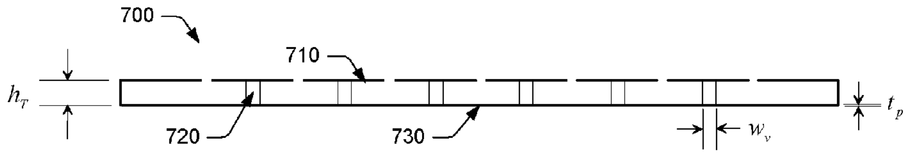
FIG. 7D is a side view of the apparatus of FIG. 7B.
Figure 7E:
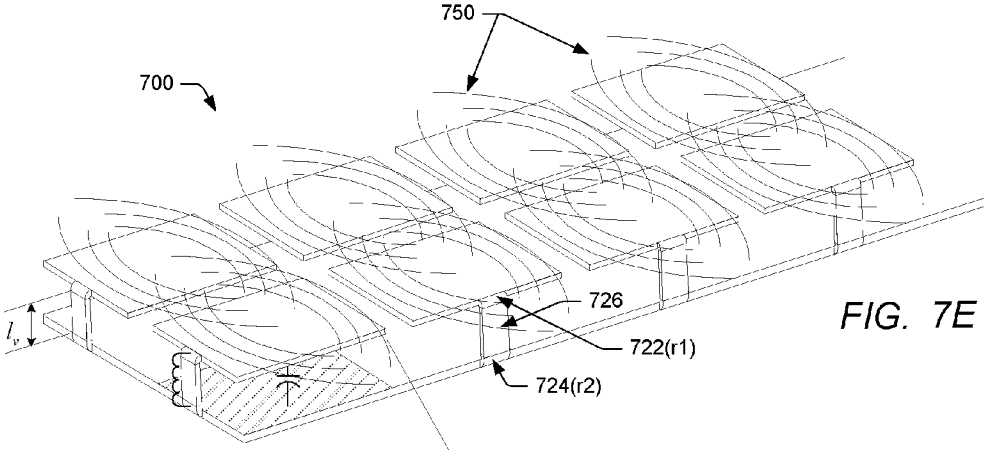
FIG. 7E is a rotated 3-D view illustrating one portion of the apparatus of FIG. 7B, where the apparatus comprises a plurality of resonant circuit elements, and where each resonant circuit element comprises a capacitive portion and one or more inductive portions.

FIG. 7E illustrates a magnified view of apparatus 270 according to one embodiment of the invention. Since the plurality of elements are identically formed and operated, only a portion of apparatus 700 is shown in FIG. 7E to improve drawing clarity. Reference should be made to FIGS. 7A-D for a complete representation of apparatus 700. In general, apparatus 700 includes a plurality of rectangular elements 710, each connected to a common reference plane 730 by a plurality of vertical segments 720. During operation, the plurality of rectangular elements 710, the plurality of vertical elements 720 and the common reference plane 730 interact with one another to form a plurality of resonant circuits, where each resonant circuit comprises a capacitive portion and an inductive portion. In the embodiment of FIGS. 7A-E, the capacitive portions are formed through interaction of the rectangular elements 710 with the common reference plane 730, while the inductive portions are formed by the vertical elements 720. Like all other embodiments of the invention, the capacitive and inductive portions are carefully balanced to set the resonant frequency of apparatus 700 equal to (or very near) the carrier frequency of the transmitted signal.

Figure 8:
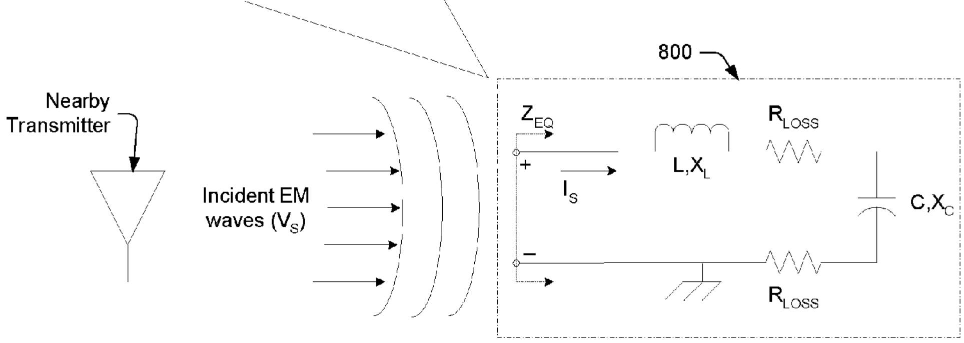
FIG. 8 is a simplified electrical circuit of one of the plurality of resonant circuit elements of FIG. 7E, and the current induced therein upon receiving electromagnetic energy radiated from an antenna of a nearby radio module.

To illustrate this concept, a single element of apparatus 700 is represented in FIG. 8 as resonant circuit 800. As shown in FIGS. 7E and 8, each vertical element is represented by the inductance (L) formed through the relatively straight 726 and bent 722, 724 portions of the vertical element. After including the capacitance (C) between the rectangular element and the common reference plane, the equivalent impedance ($Z_{EQ}$) of resonant circuit 800 can be expressed as:

$$Z_{EQ}=\sqrt{2(R_{LOSS})^2+(X_L-X_C)^2} \quad \text{[EQ. 4]}$$

where $R_{LOSS}$ is the inherent resistive loss, and $X_L$ and $X_C$ are the respective reactances, through the inductive and capacitive portions of resonant circuit 800. When a current ($I_S$) is induced by the electromagnetic energy from an incoming wave, resonant circuit 800 will resonate when the current reaches a maximum value. Since the current through resonant circuit 800 is approximately equal to:

$$I_S = \frac{V_S}{Z_{EQ}} = \frac{V_S}{\sqrt{2(R_{LOSS})^2 + (X_L - X_C)^2}} \quad \text{[EQ. 5]}$$

resonant circuit 800 will resonate when $X_C$ is substantially equal to $X_L$, or when the resonant frequency ($f_o$) of apparatus 700 is approximately equal to:

$$f_o = \frac{1}{2\pi\sqrt{LC}} \quad \text{[EQ. 6]}$$

By setting the resonant frequency ($f_o$) of apparatus 700 to the known carrier frequency ($f_c$) of the transmitted signal, the inductive (L) and capacitive (C) portions of the apparatus can be designed to resonate at (or near) the intended carrier frequency.

EQS. 4-6 generally apply to all embodiments of the invention. However, the inductive and capacitive portions of the apparatus may be created differently in some embodiments of the invention. Therefore, the equations described below for determining the inductive and capacitive portions may differ in some embodiments. For the sake of brevity, EQS. 7-11 are provided for determining the inductive and capacitive portions of the apparatus shown in FIGS. 7A-H.

As shown in FIGS. 7A-H, each capacitive portion in apparatus 700 resembles a parallel-plate capacitor, and thus, can be approximated by:

$$C = k\varepsilon_o\left(\frac{A}{d}\right), \text{ [units: Farads } (F)] \quad \text{[EQ. 7]}$$

where 'k' is the dielectric constant (e.g., $k_{air}\approx 1.0$), '$\in_o$' is the permittivity through free space (i.e., $\in_o\approx 8.854\times 10^{-12}$ F/m), 'A' is the area ($l_r \times w_r$) of one rectangular element and 'd' is the distance between the rectangular element and the common reference plane. Likewise, the inductive portions of apparatus 700 can be approximated by:

$$L_T = L_{straight} + L_{bent}, \text{ [units: microHenries } (\mu H)] \quad \text{[EQ. 8]}$$

where $L_{straight}$ and $L_{bent}$ represent the inductances through the straight section 726 and bent sections 722, 724 of the vertical element. In most cases, the inductance through the straight section is approximately equal to:

$$L_{straight} = 0.002 \times l_v\left[2.3 \times \log\left(\frac{4l_v}{d_{eff}} - 0.75\right)\right] \quad \text{[EQ. 9]}$$

where '$l_v$' is the length of the straight section and '$d_{eff}$' is the total vertical element inductance through the straight and bent portions. In most cases, '$d_{eff}$' can be estimated as:

$$d_{eff} = L_{straight} + L_{bent} = 2\sqrt{\frac{t_v \times w_v}{\pi}} \quad \text{[EQ 10]}$$

where '$t_v$' is the thickness and '$w_v$' is the width of the straight section. In most cases, the bent sections may be estimated as:

$$L_{bent} = \frac{0.394r^2N^2}{9r + 10l} \quad \text{[EQ 11]}$$

where 'r' is the radius of the bent sections, 'l' is the length of the straight sections and 'N' is the number of "turns" in the bent sections of the vertical element (e.g., N=¼x¼=½ turns in FIG. 7E).

In order to solve EQS. 7-11, approximate dimensions for apparatus 700 may be chosen based on the dimensions of the attachment surface and the wavelength of the transmitted signal. Various dimensions of apparatus 700 are shown in FIGS. 7B-D. In most cases, the total length ($l_T$) and width ($w_T$) of the apparatus will be a fraction of the longest wavelength (and therefore, the lowest frequency) used by radio modules 210 and 220. If the radio modules transmit at the same frequency (e.g., about 2.4 GHz), however, the total length and width of the apparatus will be a fraction of the same wavelength (e.g., about 124 mm). In some cases, the total width ($w_T$) of the apparatus may be limited by a relatively small attachment surface width (e.g., about 10 mm to about 30 mm in tablet computer 200). Though the total length ($l_T$) of the apparatus is generally limited to the small distance between radio modules (e.g., about 50 mm to about 260 mm in tablet computer 200), the total length is preferably equal to approximately one-half of the longest wavelength. In doing so, about half of the radiated energy will be scattered in one direction, while the other half is scattered in a substantially opposite direction. This provides maximum interference reduction by canceling most, if not all, of the radiated components from the incoming electromagnetic wave.

Due to the sub-wavelength size of apparatus 700, the dimensions of the individual elements (e.g., the rectangular and vertical elements) within apparatus 700 will be substantially less than one wavelength of the longest wavelength transmitted by a radio module associated with device 200. In most cases, the dimensions of the individual elements are substantially less than one-tenth of the longest wavelength. For example, the dimensions of the individual elements may be less than one-twelfth or one-sixteenth of the longest wavelength. When the dimensions of the individual elements are much less than one wavelength, the combination of elements form a periodic surface capable of scattering the radiated components of the incoming electromagnetic wave over a wide range of band-gap frequencies. The periodic surface scatters the radiated components by modulating the radiated components over a range of band-gap frequencies, which may extend from just below the carrier frequency of the transmitted signal to a significantly higher frequency. In some cases, the range of band-gap frequencies may extend up to four octaves above the carrier frequency, depending on the final dimensions of the individual elements.

A method for making apparatus 700 will now be described in reference to FIGS. 7A-H. As shown in FIG. 7A, the method may begin by extracting a shape of the apparatus from a thin sheet of conductive material. In general, the conductive material may be selected from substantially any metal or metal alloy. Exemplary metals and metal alloys include iron (Fe), copper (Cu), nickel (Ni), zinc (Zn), tin (Sn), gold (Au), silver (Ag), beryllium copper (BeCu), phosphor bronze (Ph+Cu/Zn/Sn), magnesium alloys (e.g., Mu-Metal: 89% Mg+10% Al+1% O), and steel (e.g., 97.5-99% Fe+1-1.5% C). In some cases, the conductive material may be substantially non-metallic, such as some low or high temperature super-conducting ceramics (e.g., BSCCO: Bismuth, Strontium, Calcium, Copper Oxide) and carbon-based materials (e.g., carbon fiber impregnated with certain metallic elements).

However, the conductive material is preferably selected from an assortment of ferrous-based materials, considering that the primary goal of the apparatus is to reduce the radiated (or magnetic) component of the electromagnetic wave. In other words, the conductive material may be selected based on it's ability to interact with magnetic fields (H-fields and/or B-fields), rather than electric fields (E-fields). Therefore, conductive materials exhibiting a particular range of relative permittivity and relative permeability values may be chosen to effectively reduce the magnetic components of the electromagnetic wave. For example, the selected material may have a relative permittivity ($\in_r$) value between about 0.0 F/m and 1.0 F/m, where $\in_r=\in/\in_0$ and $\in_0$ is substantially equal to $8.85\times 10^{-12}$ Farads/meter (F/m). Likewise, the selected material may also have a relative permeability ($\mu_r$) value between about 10 H/m and about 100,000 H/m, where $\mu_r=\mu/\mu_0$ and $\mu_0$ is substantially equal to $1.257\times 10^{-6}$ Henries/meter (H/m). It is noted that the above permittivities and permeabilities may only be valid at room temperature over the frequency range of interest.

In some cases, the step of extracting may be performed by stamping the shape from the thin sheet of conductive material using a die to produce many parts at high volume and low cost. In other cases, the shape may be laser or chemically etched from the thin sheet of conductive material. In laser etching, a laser cutting tool is used to accurately cut the shape from the thin sheet. In chemical etching, the thin sheet may be optically exposed to a pattern (i.e., a photoresist), cured and then exposed to an acid bath until the part emerges. Though laser and chemical etching processes are able to produce the parts at slightly higher cost and lower volume, they may do so with substantially higher accuracy than most stamping processes. Therefore, laser etching or chemical etching processes may be preferred for accurately etching patterns with relatively small dimensions (such as, for example, the vertical elements 720 of FIG. 7).

In one preferred embodiment, the shape of apparatus 700 is chemically etched from a thin sheet (e.g., between about 0.1 mm and about 0.2 mm) of cold rolled steel, a popular material often chosen for it's low cost, high strength and ease of workability. However, other ferrous-based materials and/or forms thereof may be substituted for cold rolled steel, in alternative embodiments of the invention. In most cases, the sheet thickness may be selected to maintain the structural integrity of the apparatus, while enabling the individual elements to resonate freely. In one preferred embodiment, the sheet thickness may be approximately 0.15 mm (i.e., about 6 mils); other sheet thicknesses may be used in alternative apparatus designs. Though sheet thickness is shown only for the common reference plane ($t_p$) in FIG. 7D, the same thickness should be used for the rectangular and vertical elements (denoted $t_r$ and $t_v$, respectfully).

After the shape is extracted, it may be folded to form the plurality of rectangular elements, the plurality of vertical elements and the common reference plane, as shown in FIGS. 7B-7D. Assuming the longest wavelength is substantially equal to 2.4 GHz, the individual elements of the apparatus may be dimensioned as follows: the length ($l_r$) and width ($w_r$) of the rectangular elements may range between about 6.0-7.0 mm; the spacing ($s_r$) between rectangular elements may range between about 0.5-1.0 mm; the width ($w_v$) of the vertical elements may range between about 1.0-2.0 mm; the radius (r1) of upper bent section 722 may range between about 0.5-1.1 mm, the radius (r2) of lower bent section 724 may range between about 0.1-0.5 mm; and the length ($l_v$) of straight section 726 may range between about 0.5-3.0 mm. When apparatus 700 is formed as an array of elements, the total width ($w_T$) of the apparatus may range between about 13.0-15.0 mm, whereas the total height ($h_T$) may range between about 1.0-3.0 mm. However, the total length ($l_T$) of the apparatus should remain substantially constant at around 62 mm, or in other words, about one-half of the transmission signal wavelength.

When these values are plugged into EQS. 6-11, the inductive and capacitive portions of apparatus 700 can be accurately designed to resonate at (or near) the intended carrier frequency. In one embodiment, apparatus 700 may be formed according to the following dimensions: the length ($l_r$) and width ($w_r$) of the rectangular elements may be about 6.9 mm and 6.75 mm, respectively; the spacing ($s_r$) between rectangular elements may be about 1.0 mm; the width ($w_v$) of the vertical elements may be about 1.2 mm; the radius (r1) of upper bent section 722 may be about 0.15 mm, the radius (r2) of lower bent section 724 may be about 0.15 mm; the length ($l_v$) of straight section 726 may be about 1.7 mm; the total width ($w_T$) of the apparatus may be about 14.5 mm, the total height ($h_T$) may be about 2.3 mm; and the total length ($l_T$) of the apparatus may be about 62.1 mm.

The above dimensional values are given for explanatory purposes only and should not be considered to limit the scope of the invention. Instead, dimensional values for a particular apparatus design may be chosen based on several factors including, but not limited to, the desired band-gap frequency range within which interference is to be reduced. In some cases, the dimensional values described above for apparatus 700 may actually fall within a range of values, similar to those described below and in reference to FIGS. 10B and 11B.

Figure 7F:
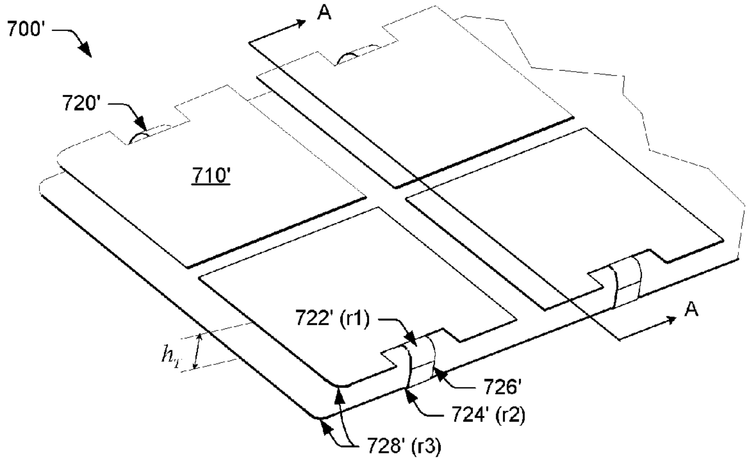
FIG. 7F is a rotated 3-D view illustrating one portion of a modified embodiment of the apparatus shown in FIG. 7B.
Figure 7G:
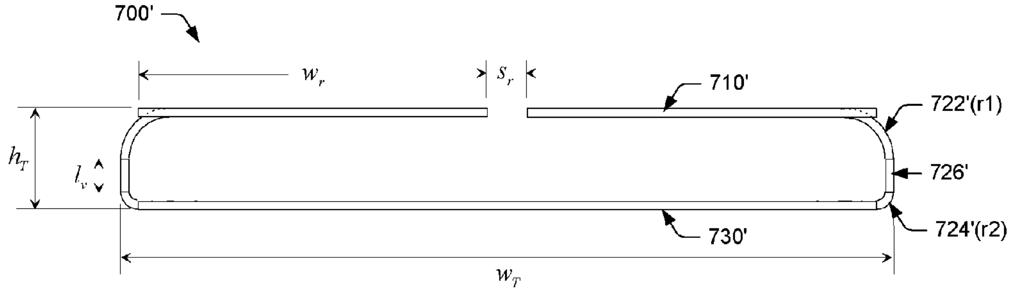
FIG. 7G is a cross-sectional view through line AA of the apparatus of FIG. 7F, illustrating the modified inductive portions in more detail.
Figure 7H:
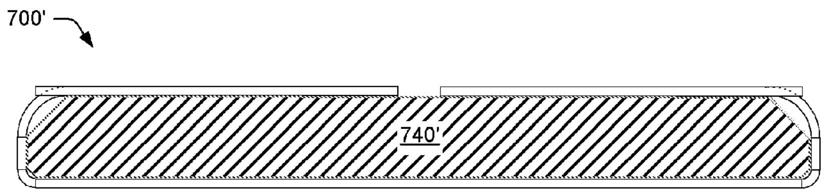
FIG. 7H is a cross-sectional view through line AA of the apparatus of FIG. 7F, illustrating the modified inductive and capacitive portions in more detail.

In some embodiments, it may be desirable to modify the inductive and/or capacitive portions of the apparatus. For example, the inductive and/or capacitive portions may be modified to accommodate a particular frequency within the band-gap frequency range, or to alter a dimension of the apparatus. FIGS. 7F-H illustrate exemplary methods for forming modified apparatus 700'.

In FIGS. 7F-H, the height of vertical elements 720' is decreased (and thus, the inductance there through increased) to reduce the overall height ($h_T$) of apparatus 700'. This may be achieved, for example, by shortening straight section 726' and increasing the curvature of bent sections 722', 724' within each of the vertical elements. In one embodiment, the radius (r1) of upper bent section 722' may be increased to about 0.7 mm, the radius (r2) of lower bent section 724' may be increased to about 0.15 mm, and the length ($l_v$) of straight section 726' may be decreased to about 0.85 mm. As a result, the overall height ($h_T$) of apparatus 700' may be decreased to about 1.7 mm. In some cases, the outer edges 728' of apparatus 700' may be rounded to improve manufacturability, as shown in FIG. 7F. Other modifications not disclosed herein can be made to apparatus 700' to accommodate any carrier frequency, apparatus dimension and/or manufacturing process.

As shown in FIG. 7H, dielectric material 740' may be formed between rectangular elements 710' and common reference plane 730' to increase the capacitive portions of apparatus 700'. Though the dielectric material may be formed according to substantially any process known in the art, an injection molding process may be used for purposes of mass production. In general, the capacitive portions may be increased by selecting a material with a dielectric constant (k) greater than 1.0. In one preferred embodiment, a virgin Teflon (PTFE) dielectric layer may be formed between rectangular elements 710' and common reference plane 730' to provide approximately twice as much capacitance (i.e., $k_{PTFE} \approx 2.0$) as the air-core embodiment shown in FIGS. 7A-E. However, it may be necessary to bevel the corners of the dielectric material to avoid interfering with the air-core inductance of the bent portions and altering the overall inductance of vertical elements 720'. Alternative dielectric materials may be used in other embodiments; however, even slight changes to the dielectric constant may require other dimensions of the apparatus to be modified.

Figure 9:
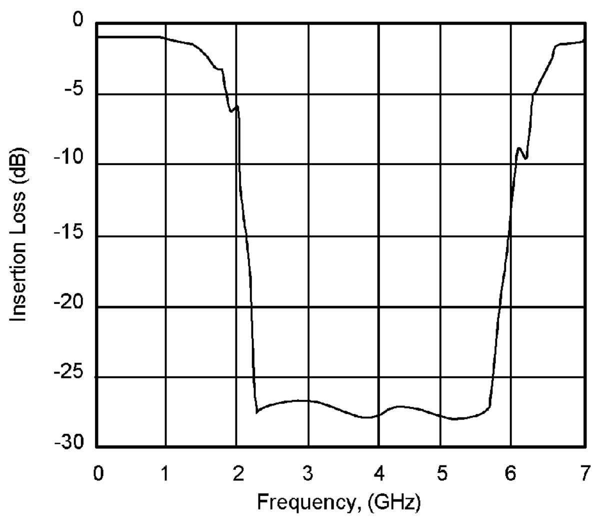
FIG. 9 is a graph illustrating a typical insertion loss that may be obtained by arranging the radio modules and apparatus, as shown in FIG. 6, for the embodiment of the apparatus shown in FIG. 7H.

FIG. 9 illustrates the improved frequency response provided by the modified apparatus 700' shown in FIG. 7H. In particular, FIG. 9 illustrates an exemplary insertion loss (i.e., approx. −27 dB to −36 dB) that may be obtained by arranging apparatus 700' between radio modules 210 and 220, as described above in reference to FIG. 6. As shown in FIG. 9, apparatus 700' surpasses the minimum goal for adjacent channel interference within Bluetooth™ radios (e.g., Bluetooth™ protocols specify a minimum of −30 dB insertion loss, and suggest −40 dB for signals separated by two channels). In other words, apparatus 700' may suppress up to about 77% of the radiated energy from the electromagnetic wave.

In addition to the carrier frequency of the transmitted signal, apparatus 700' may block substantially all of the energy radiated within band-gap frequency range 900. As shown in FIG. 9, band-gap frequency range 900 may continuously extend between about 2.40 GHz and 7.2-9.6 GHz, or approximately 4 octaves above the carrier frequency of the transmitted signal (e.g., about 2.402 GHz to 2.483 GHz). In some cases, the broad frequency response of apparatus 700' may protect a nearby radio module from signals transmitted at different carrier frequencies. For example, radio module 210 may support both IEEE 802.11a protocols (which transmit at about 5.4 GHz) and IEEE 802.11b protocols (which transmit at about 2.4 GHz), in some embodiments of the invention. As long as the carrier frequencies fall within band-gap frequency range 900, both radio modules will be protected, at least to some degree, from the harmful affects of interference.

An apparatus and method for reducing electromagnetic interference between co-located radio modules within a wireless communication device have now been described in accordance with some embodiments of the invention. In other words, the electromagnetic energy radiated from a transmitting radio module may be significantly reduced (e.g., up to about 77%) by: 1) arranging a nearby radio module at a location of minimum radiated energy, 2) providing an interference reducing apparatus with an overall length of approximately one-half of the transmission signal wavelength, and 3) arranging the interference reducing apparatus between the radio modules at a location of maximum radiated energy. Depending on which radio module is considered to be "weaker," the apparatus may be arranged at the location of maximum radiated energy immediately preceding, or immediately following, the "weaker" radio module. In this manner, the apparatus may reduce electromagnetic interference by intercepting and scattering the radiated energy away from the "weaker" radio module. In other words, interference is primarily reduced through re-radiation/reflectance of the radiated (or magnetic) components of an incoming electromagnetic wave. The apparatus reduces interference to acceptable levels even when the incoming wave travels between radio modules arranged along a common conductive surface (i.e., a scenario that typically produces high levels of interference).

Unlike prior art methods, the electromagnetic energy radiated from a transmitting radio module is conserved by the apparatus described herein. Thus, interference is reduced without attenuating the transmitted signal or decreasing the power efficiency of the transmitting radio module. By electrically isolating the apparatus from all power sources and ground nodes, the apparatus also functions to reduce interference without increasing system power requirements. Furthermore, the apparatus is formed using a simple, low-cost manufacturing process, which produces an extremely light-weight design that contributes negligible weight to small wireless communication devices and host computer systems.

Alternative embodiments of the apparatus will now be described in reference to FIGS. 10-12. Since all embodiments are substantially identical in function, the following discussion will focus on the methods for forming the alternative embodiments.

Figure 10A:
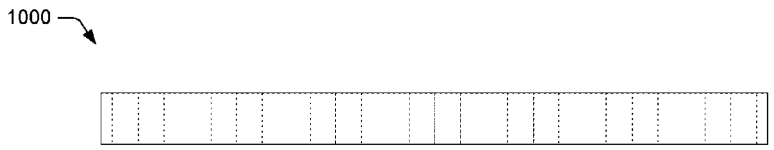
FIG. 10A is a top view illustrating an unfolded pattern of another embodiment of the apparatus shown in FIG. 6.
Figure 10B:
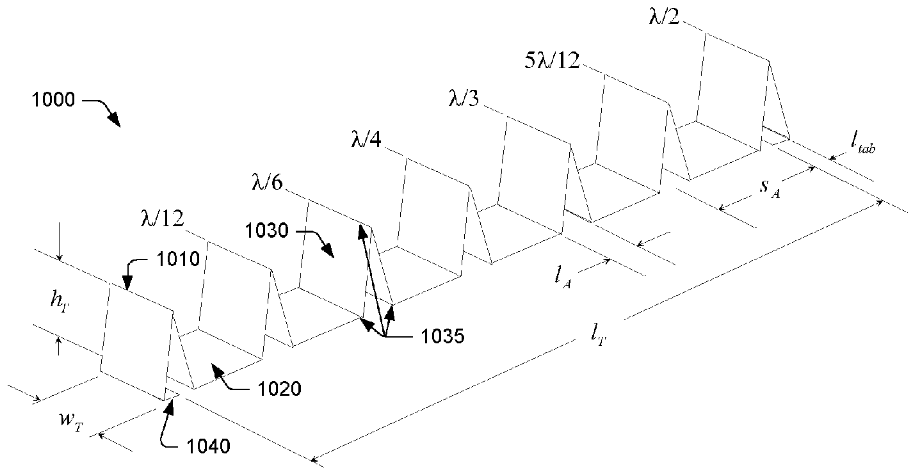
FIG. 10B is a rotated 3-D view of an apparatus formed in accordance with the unfolded pattern of FIG. 10A.
Figure 10C:
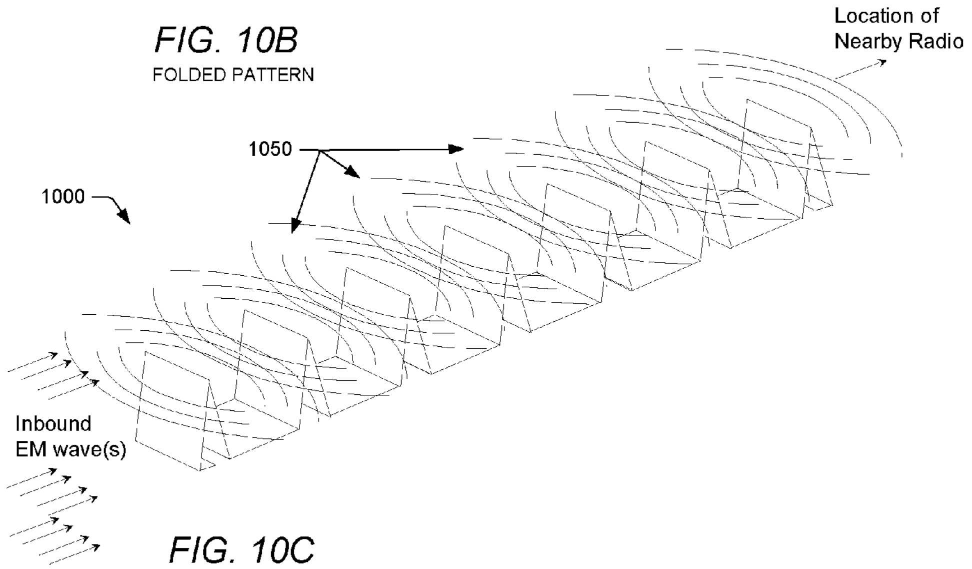
FIG. 10C is a rotated 3-D view of the apparatus of FIG. 10B, illustrating the standing wave patterns produced by the apparatus upon intercepting radiated energy from an incoming electromagnetic wave.

In some cases, alternative embodiments of the apparatus may be formed by the same methodology described above. In FIGS. 10A-C, for example, apparatus 1000 is formed by extracting a shape of the apparatus from a thin sheet of conductive material, and then folding the shape into a plurality of elements. The thin sheet of conductive material is generally chosen from an assortment of ferrous-based materials (e.g., steel or Mu-Metal) ranging in thickness between about 0.1-0.2 mm. Unlike apparatus 700, however, the plurality of elements within apparatus 1000 include a plurality of A-shaped elements 1010 spaced apart by a plurality of horizontal segments 1020. During operation, the plurality of A-shaped elements 1010 and the plurality of horizontal segments 1020 interact with one another to form a plurality of resonant circuits, where each resonant circuit comprises a capacitive portion (provided by the flat surfaces 1030 of an A-shaped element) and an inductive portion (provided by the folded regions 1035 of the A-shaped element). In some cases, apparatus 1000 may include a pair of end tabs 1040 for securing the apparatus to a surface of wireless communications device 200. End tabs 1040 may not be needed if alternative means are used for securing the apparatus.

When combined, the plurality of elements within apparatus 1000 form a periodic surface that may be, e.g., one-twelfth of the longest wavelength (λ) used by radio modules 210 and 220 (of FIGS. 2 and 6). In other words, the plurality of A-shaped elements 1010 may each be spaced by approximately λ/12. Though alternative spacings may be used in other embodiments of the invention, the spacing between elements and other dimensions of the apparatus should be tailored to the longest wavelength (and thus, lowest frequency) used by radio modules 210 and 220. Assuming the longest wavelength is about 124 mm at 2.4 GHz, apparatus 1000 may be dimensioned as follows: the spacing ($s_A$) between each A-shaped element 1010 may range between about 10-11 mm; the length ($l_A$) of each A-shaped element 1010 may range between about 1-10 mm; the total length ($l_T$) of apparatus 1000 may range between about 60-65 mm; the total width ($w_T$) of apparatus 1000 may range between about 8-16 mm; and the total height ($h_T$) of apparatus 1000 may range between about 4-7 mm. The length of end tabs 1040 may range between about 0-2 mm.

Figure 11A:
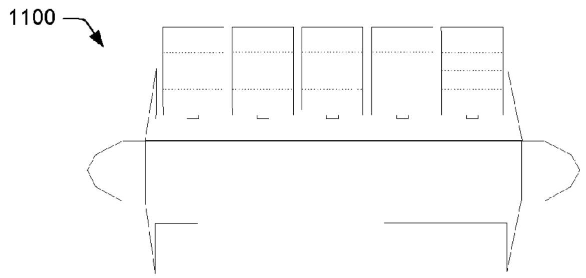
FIG. 11A is a top view illustrating an unfolded pattern of yet another embodiment of the apparatus shown in FIG. 6.
Figure 11B:
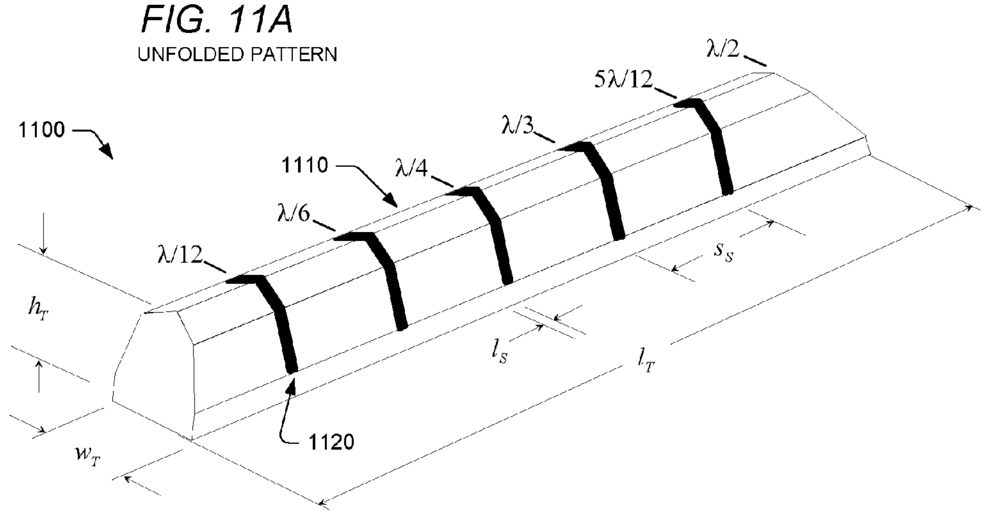
FIG. 11B is a rotated 3-D view of an apparatus formed in accordance with the unfolded pattern of FIG. 11A.
Figure 11C:
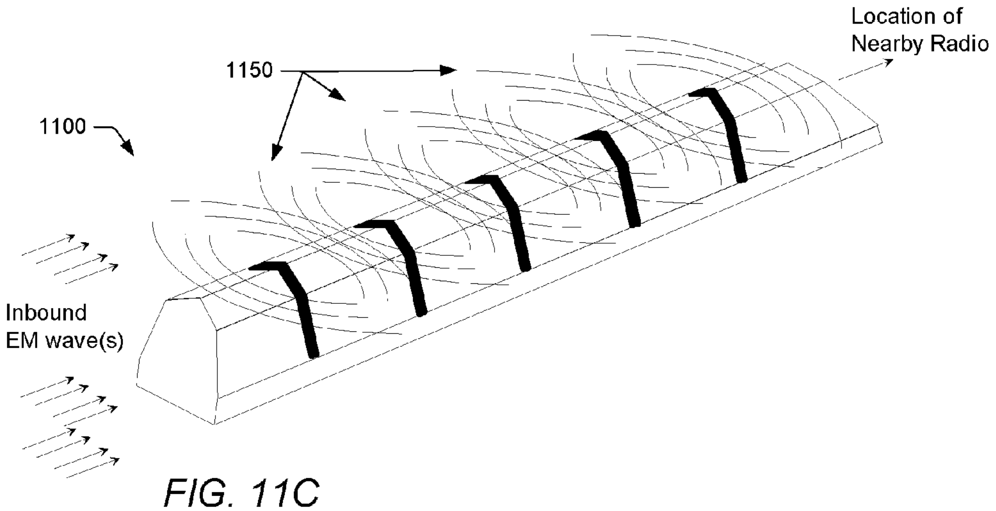
FIG. 11C is a rotated 3-D view of the apparatus of FIG. 11B, illustrating the standing wave patterns produced by the apparatus upon intercepting radiated energy from an incoming electromagnetic wave.

In some cases, apparatus 1100 of FIGS. 11A-C may also be formed by extracting a shape of the apparatus from a thin sheet of conductive material, and then folding the shape into a plurality of elements. In such cases, the material composition and thickness of the thin sheet of conductive material may be similar to, or different from, those described above. Similar to the embodiments of FIGS. 7 and 10, apparatus 1100 is generally formed to include a plurality of resonant circuit elements. As shown in FIG. 11B, the plurality of elements of apparatus 1100 include a plurality of relatively long domed elements 1110 spaced apart by a plurality of relatively thin slots 1120. During operation, the plurality of domed elements 1110 and the plurality of slots 1120 interact with one another to form a plurality of resonant circuits, where each resonant circuit comprises a capacitive portion (provided by the space within slots 1120) and an inductive portion (provided by the shape of domed elements 1110). In some cases, a dielectric material may be inserted between each of the plurality of slots 1120 to increase the capacitive portion of the resonant circuits. For example, a dielectric material may be inserted to balance the overall apparatus package dimensions.

Similar to the embodiments described above, the plurality of elements within apparatus 1100 may also form a periodic surface that is approximately one-twelfth of the transmission signal wavelength (λ). In other words, the plurality of slots 1120 may each be spaced by approximately λ/12. Though alternative spacings may be used in other embodiments of the invention, the spacing between slots and other dimensions of the apparatus should be tailored to the longest wavelength (and thus, the lowest frequency) used by radio modules 210 and 220 (of FIGS. 2 and 6). Assuming the longest wavelength is about 124 mm at 2.4 GHz, apparatus 1100 may be dimensioned as follows: the spacing ($s_s$)) between each of the plurality of slots 1120 may range between about 10-11 mm; the length ($l_s$) of each of the plurality of slots 1120 may range between about 1-10 mm; the total length ($l_T$) of apparatus 1100 may range between about 60-65 mm; the total width ($w_T$) of apparatus 1100 may range between about 8-16 mm; and the total height ($h_T$) of apparatus 1100 may range between about 4-7 mm mm.

The apparatus may be formed by a substantially different methodology in other embodiments of the invention. For example, apparatus 1100 (of FIGS. 11A-C) and/or apparatus 1200 (of FIGS. 12A-C) may be formed by one of several commonly known molding processes. As such, the method may begin by providing a mold having various cavities within which the apparatus is to be formed. Next, a liquefied substance may be inserted into the mold to fill the various cavities. In general, the step of inserting a liquefied substance may comprise pouring or injecting a liquefied metal or metal alloy into the mold. Specific details of the liquefaction process may be dependent on several factors (e.g., the chosen process, the particular material to be liquefied, electrical and mechanical properties desired of the end product, etc.); all of which may be known to those skilled in the art.

In some cases, the liquefied substance may be poured into the mold and allowed to cure in accordance with a cast molding process. For example, a metal or metal alloy may be heated to reach a semi-liquid, or plastic state. The temperature required for reaching the plastic state generally depends on the material being heated (e.g., Al: about 560-610° C., Steel: about 1382-1432° C.). Substantially any material suitable for cast molding may be used; however, a ferrous-based material is generally preferred over non-ferrous-based materials for the reasons set forth above. Once the material reaches the plastic state, it may be poured into the mold and allowed to cool until hard set.

In other cases, a cast molding process may be undesirable due to the relatively long cure time, low volume and low repeatability associated with such processes. Thus, the liquefied substance may alternatively be drawn into the mold and allowed to cure in accordance with an extrusion molding process. For example, a metal or metal alloy may be heated to reach a semi-liquid, or plastic state, as described above. The heated material may then be drawn into the mold and allowed to cool until hard-set. Once set, the molded form may be cut to form individual apparatuses. As noted above, a ferrous-based material is generally preferred, although other materials suitable for extrusion molding may be used. Because the extrusion molding process may suffer from the same disadvantages as the cast molding process, extrusion molding may not be preferred in some embodiments.

In yet other cases, the liquefied substance may be injected into the mold and allowed to cure in accordance with a relatively low-pressure, low-temperature molding process, such as a transfer molding process. In the transfer molding process, a molding compound is preheated within an auxiliary chamber (called a transfer pot) to a temperature, which is below the transfer temperature (i.e., the temperature at which the molding compound is transferred from the chamber to the mold cavities). The molding compound is then forced into the mold cavities by applying a transfer pressure, which is often maintained for an optimum amount of time to ensure complete filling of the mold cavities. Once the mold cavities have been filled, a packing pressure, usually higher than the transfer pressure, and a mold temperature are applied. The mold temperature should be high enough to ensure rapid curing, but low enough to prevent "precure" or solidification of the molding compound before it reaches the mold cavities. After curing the molding compound for an optimum amount of time at the mold temperature, the mold is opened and the molded apparatus removed via ejector pins. The apparatus may then be postcured at a temperature somewhat lower than the mold temperature, but well above the room temperature, for several hours to complete the curing process.

In yet other cases, the liquefied substance may be injected into the mold and allowed to cure in accordance with a relatively high-pressure, high-temperature molding process, such as an injection molding process. In the injection molding process, a solid molding compound (in either powder or granular form) is fed into a plasticating extruder where pressure and temperature are applied to liquefy the molding compound. The molten compound, now having a relatively high temperature, is forced into the mold cavities under a relatively high pressure. In most cases, the high injection pressure is maintained until the mold is filled and the molten compound has cooled to a substantially solid state. In some cases, additional molding compound may be injected to compensate for changes in compound density during the solidification process. After adequate cooling, the mold is opened and the molded apparatus is removed (via ejector pins) and transferred to an oven for postcuring.

In either case, a particular molding compound may be selected for its ability to withstand the temperatures and pressures typically associated with the transfer molding and injection molding processes. The temperatures, pressures and times associated with the transfer and injection molding processes are generally known in the art, and therefore, are omitted from this discussion for the sake of brevity. However, as noted above, the molding compound is preferably selected from an assortment of ferrous-based materials, so that the apparatus may effectively reduce the radiated (or magnetic) components of the incoming electromagnetic wave.

Figure 12A:
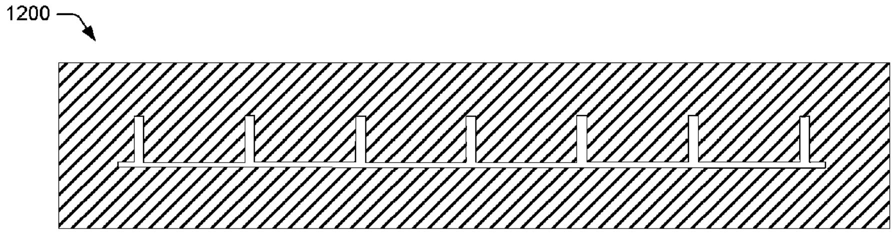
FIG. 12A is a cross-sectional view of a mold that may be used to form an alternative embodiment of the apparatus shown in FIG. 6.
Figure 12B:
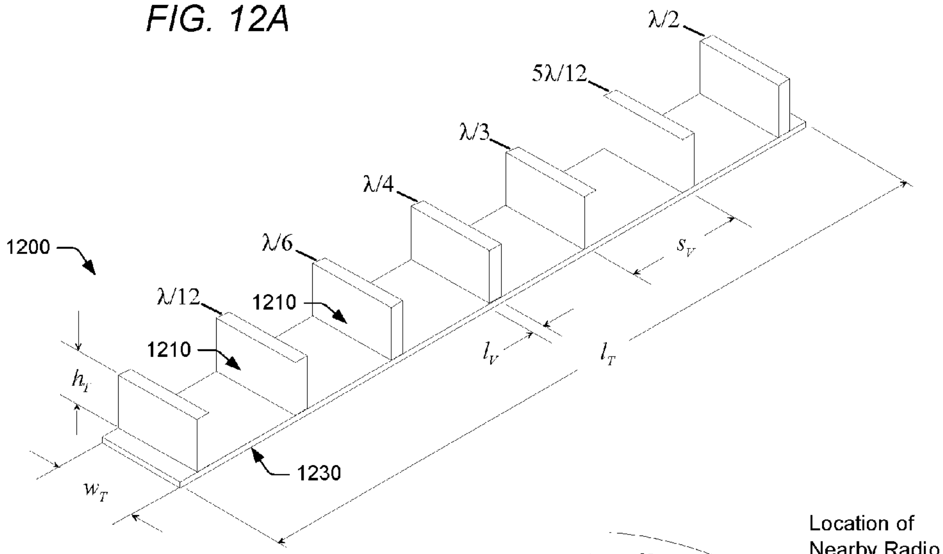
FIG. 12B is a rotated 3-D view of an apparatus formed in accordance with the mold shown in FIG. 12A.

Similar to FIGS. 7, 10 and 11, apparatus 1200 is generally formed to include a plurality of resonant circuit elements. As shown in FIG. 12B, the plurality of elements of apparatus 1200 include a plurality of vertical elements 1210, which are spaced apart from one another and periodically coupled to a common reference plane 1230 at various locations. During operation, the plurality of vertical elements 1210 interact with the common reference plane 1230 to form a plurality of resonant circuits, where each resonant circuit comprises a capacitive portion (provided by the spaces between vertical elements 1210) and an inductive portion (provided by the coupling regions at the various locations). In some cases, a dielectric material may be inserted between each of the plurality of the vertical elements (i.e., within the spaces therebetween) to increase the capacitive portion of the resonant circuits.

Unlike the embodiments described above, however, the plurality of elements within apparatus 1200 form a periodic surface that is approximately one-sixteenth of the transmission signal wavelength (λ). In other words, the plurality of vertical elements 1210 may each be spaced by approximately λ/16. Though alternative spacings may be used in other embodiments of the invention, the spacing between vertical elements and other dimensions of the apparatus should be tailored to the longest wavelength (and thus, the lowest frequency) used by radio modules 210 and 220 (of FIGS. 2 and 6). Assuming the longest wavelength is about 124 mm at 2.4 GHz, apparatus 1200 may be dimensioned as follows: the spacing ($s_V$)) between each of the plurality of vertical elements 1210 may range between about 5-10 mm; the length ($l_V$) of each of the plurality of vertical elements 1210 may range between about 1-2 mm; the total length ($l_T$) of apparatus 1200 may range between about 60-65 mm; the total width ($w_T$) of apparatus 1200 may range between about 8-16 mm; and the total height ($h_T$) of apparatus 1200 may range between about 4-7 mm.

Figure 12C:
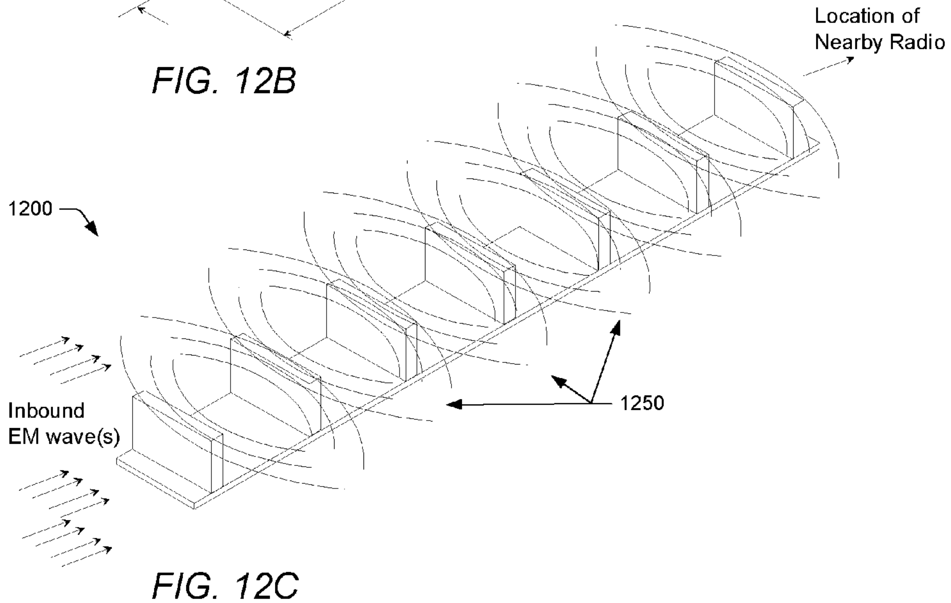
FIG. 12C is a rotated 3-D view of the apparatus of FIG. 12B, illustrating the standing wave patterns produced by the apparatus upon intercepting radiated energy from an incoming electromagnetic wave.

FIGS. 10C, 11C, and 12C illustrate the standing wave patterns (1050, 1150 and 1250) that may be produced by the apparatuses (1000, 1100 and 1200) when activated by radiated energy from the incoming electromagnetic wave. Though each of the standing wave patterns resonates at (or near) the carrier frequency of the incoming wave, constructive and destructive interference between the standing wave patterns functions to scatter the incoming wave by modulating the radiated components into a wide range of band-gap frequencies. Though FIG. 9 shows a typical frequency response for apparatus 700' only, similar frequency responses may be demonstrated for apparatuses 1000, 1100, and 1200.

It will be appreciated to those skilled in the art having the benefit of this disclosure that this invention is believed to provide an apparatus and method for reducing the electromagnetic interference between two or more radio modules arranged within, or otherwise closely coupled to, a wireless communication device. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A method for reducing electromagnetic interference between two or more antennas coupled to a wireless communication device in close proximity to one another, and wherein the method comprises:

coupling a first antenna to a surface of the communications device, wherein the first antenna is configured to transmit a wireless signal by radiating electromagnetic energy, and wherein the electromagnetic energy propagates along the surface as a plane wave having alternating minimum and maximum electromagnetic energy levels at distinct locations along the surface of the communications device;

coupling a second antenna to the surface of the communications device, such that a receiving end of the second antenna is positioned at a furthest location of minimum electromagnetic energy available along the surface; and coupling an apparatus to the communication device between the first and second antennas, such that a center of the apparatus is positioned at a location of maximum electromagnetic energy, wherein the apparatus is configured to reduce electromagnetic interference at the second antenna by intercepting at least a portion of the electromagnetic energy radiated from the first antenna and resonating with the intercepted electromagnetic energy to produce a plurality of standing wave patterns, which constructively and destructively interfere with one another to redirect the intercepted electromagnetic energy away from the second antenna.

2. The method of claim 1, wherein the distinct locations of minimum and maximum electromagnetic energy levels correspond to fractional amounts of a wavelength of the transmitted signal.

3. The method of claim 1, wherein the location of maximum electromagnetic energy immediately precedes the second antenna and the furthest location of minimum electromagnetic energy.

4. The method of claim 1, wherein the location of maximum electromagnetic energy immediately follows the first antenna and a first location of minimum electromagnetic energy.

5. The method of claim 1, further comprising providing the apparatus with a periodic surface that resonates with the intercepted electromagnetic energy to produce the plurality of standing wave patterns, which then combine to redirect the intercepted electromagnetic energy away from the second antenna.

6. The method of claim 5, wherein the steps of providing the apparatus and coupling the apparatus enable the electromagnetic interference to be reduced without absorbing the electromagnetic energy radiated from the first antenna or decreasing a transmission power level of the transmitted signal.

7. The method of claim 6, wherein the steps of providing the apparatus and coupling the apparatus provide an insertion loss of about −25 dB to about −35 dB between the first and second antennas.

8. The method of claim 1, wherein the first antenna is configured to transmit wireless signals by radiating electromagnetic energy in an omni-directional radiation pattern.

9. A method for reducing electromagnetic interference between at least a first antenna and a second antenna, wherein the first and second antennas are attached to a wireless communication device in close proximity to each other, and wherein the method comprises:

transmitting a signal by radiating electromagnetic energy from the first antenna, wherein at least a portion of the electromagnetic energy propagates toward the second antenna; and utilizing an apparatus, which is attached to the communication device between the first and second antennas, to reduce electromagnetic interference at the second antenna by:

intercepting the portion of the electromagnetic energy propagating toward the second antenna; and resonating at a carrier frequency of the transmitted signal to produce a plurality of standing wave patterns, which constructively and destructively interfere with one another to redirect the portion of the electromagnetic energy away from the second antenna.

10. The method of claim 9, further comprising operating the second antenna substantially concurrently with said transmitting.

11. The method of claim 9, wherein said resonating enables the apparatus to operate over a relatively wide range of band-gap frequencies, wherein said operation comprises said intercepting, resonating and redirecting.

12. The method of claim 11, wherein the relatively wide range of band-gap frequencies comprises the carrier frequency of the transmitted signal and extends approximately two to four octaves above the carrier frequency.

13. The method of claim 12, wherein the carrier frequency of the transmitted signal is equal to about 2.4 GHz, and wherein the range of band-gap frequencies extends from about 2.3 GHz to about 9.6 GHz.

* * * * *